US010338979B2

(12) United States Patent
Millhuff et al.

(10) Patent No.: US 10,338,979 B2
(45) Date of Patent: Jul. 2, 2019

(54) MESSAGE PATTERN DETECTION AND PROCESSING SUSPENSION

(71) Applicant: Chicago Mercantile Exchange Inc., Chicago, IL (US)

(72) Inventors: Paul Millhuff, Tinley Park, IL (US); Neil Lustyk, Chicago, IL (US); John Scheerer, Chicago, IL (US); James Bailey, Chicago, IL (US); Supreet Dhillon, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 158 days.

(21) Appl. No.: 15/702,145

(22) Filed: Sep. 12, 2017

(65) Prior Publication Data
US 2018/0060146 A1     Mar. 1, 2018

Related U.S. Application Data

(63) Continuation of application No. 15/253,038, filed on Aug. 31, 2016, now Pat. No. 9,792,164.

(51) Int. Cl.
*G06F 9/46*     (2006.01)
*G06F 9/54*     (2006.01)
*G06Q 40/04*     (2012.01)

(52) U.S. Cl.
CPC .............. *G06F 9/546* (2013.01); *G06F 9/466* (2013.01); *G06Q 40/04* (2013.01)

(58) Field of Classification Search
None
See application file for complete search history.

(56) References Cited

U.S. PATENT DOCUMENTS

| | | | |
|---|---|---|---|
| 7,039,619 B2 | 5/2006 | Nugent | |
| 7,224,297 B2 | 5/2007 | Trout | |
| 7,831,491 B2 | 11/2010 | Newell et al. | |
| 7,853,499 B2 | 12/2010 | Czupek et al. | |
| 2004/0205770 A1 | 10/2004 | Zhang et al. | |
| 2005/0096999 A1 | 5/2005 | Newell et al. | |
| 2005/0203826 A1 | 9/2005 | Farrell et al. | |
| 2007/0118460 A1 | 5/2007 | Bauerschmidt et al. | |
| 2014/0006243 A1 | 1/2014 | Boudreault et al. | |
| 2014/0297504 A1 | 10/2014 | Bergenudd et al. | |
| 2015/0026033 A1 | 1/2015 | Curran et al. | |
| 2015/0073962 A1 | 3/2015 | Bixby et al. | |
| 2015/0127516 A1 | 5/2015 | Studnitzer et al. | |
| 2016/0048370 A1 | 2/2016 | Zenoff | |

OTHER PUBLICATIONS

International Search Report and Written Opinion from, PCT Application No. PCT/US2017/038494, dated Sep. 18, 2017, WO.

*Primary Examiner* — Tuan C Dao
*Assistant Examiner* — William C Wood
(74) *Attorney, Agent, or Firm* — Lempia Summerfield Katz LLC

(57) ABSTRACT

A transaction suspension system rapidly determines whether messages received by a data transaction processing system correspond to a stored message pattern. Stored message patterns may relate to a transaction type associated with each message, which sources transmitted the messages, and when messages were received by the data transaction processing system. The transaction suspension system may prevent the processing of messages, e.g., messages from a specific source, even if the messages would have otherwise qualified for processing or execution.

20 Claims, 25 Drawing Sheets

Time t = 2:54:03.0055 pm

MESSAGE PATTERN DETECTION AND PROCESSING SUSPENSION

PRIORITY CLAIM

This application claims priority to and the benefit as a continuation of U.S. patent application Ser. No. 15/253,038, filed Aug. 31, 2016, entitled, "Message Pattern Detection And Processing Suspension", now U.S. Pat. No. 9,792,164, issued Oct. 17, 2017, the entirety of which is herein incorporated by reference.

BACKGROUND

An exchange computing system may receive and process hundreds of messages from various different sources, e.g., market participant computing systems, in the course of a few milliseconds. Certain messages, which may form, or be part of, a message pattern, may adversely affect an exchange computing system transaction processing system, e.g., by unnecessarily increasing the volume of work performed by the transaction processing system or otherwise unnecessarily consuming resources.

DETAILED DESCRIPTION

Figure 1A:
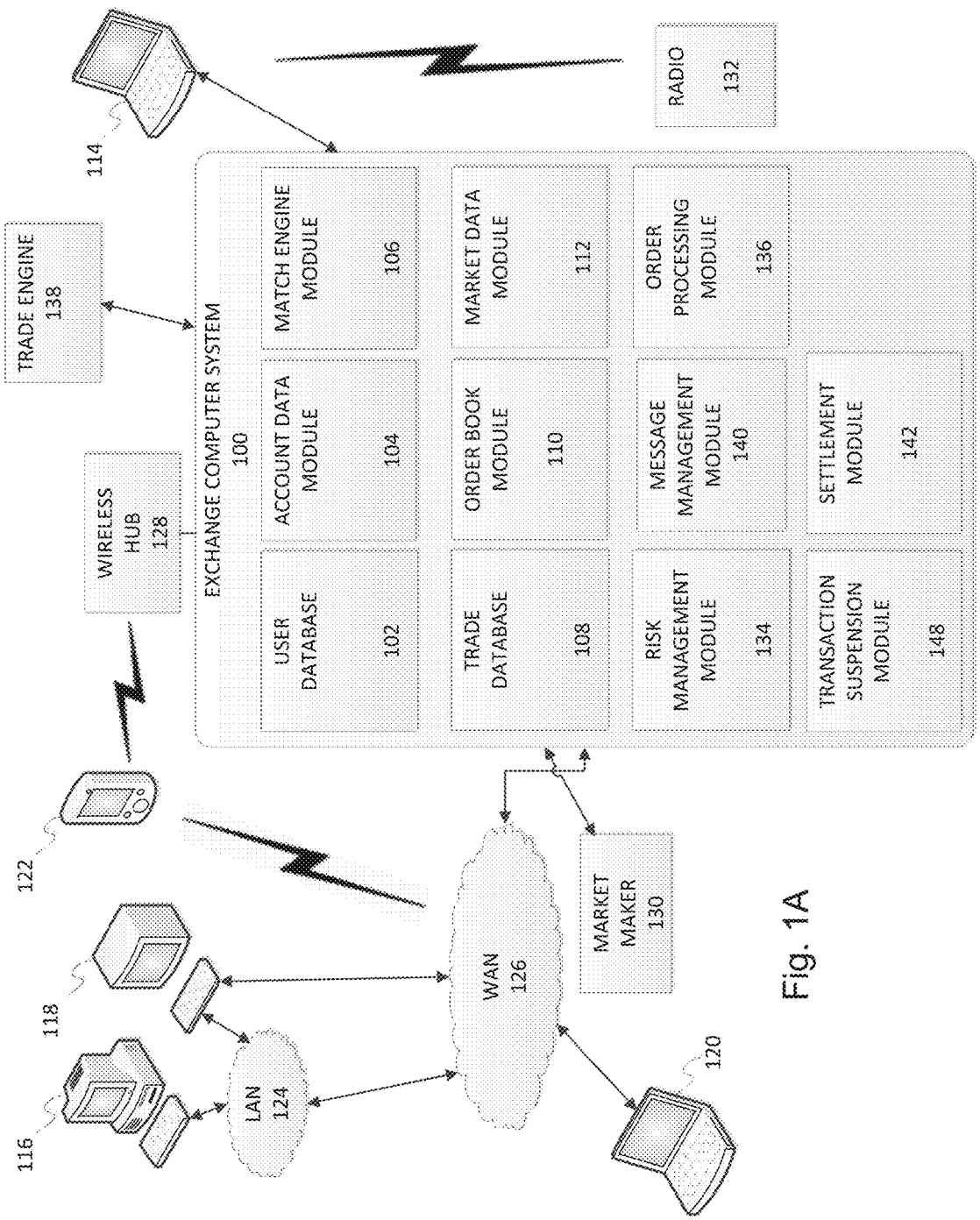
FIG. 1A depicts an illustrative computer network system that may be used to implement aspects of the disclosed embodiments.

The disclosed embodiments relate generally to a data communications system/network, for use by a data transaction processing system, which includes a transaction suspension system for rapidly determining whether certain messages received by the data transaction processing system, which may be related to data objects processed thereby, or actions implemented, caused or requested thereby, should be suspended, e.g., blocked, deleted from memory, or otherwise temporarily delayed for a predetermined amount of time, to detect and mitigate undesirable message patterns. The transaction suspension system may, in one embodiment, operate in a stateful manner, i.e., depend upon historical/prior messages received, and/or rely upon previous results thereof or previous decisions made, by the transaction processing system. The transaction suspension system may also access data structures storing information about a current environment state to determine whether a new message should be processed or suspended.

The disclosed transaction suspension system improves upon the technical field of transaction processing by detecting and mitigating the effects of undesirable message patterns. Even though transaction processing systems are designed and intended to process transactions as quickly as possible, the disclosed transaction suspension system is a specific implementation which provides useful and unexpected results by selectively avoiding the core function of transaction processing systems in specifically detected cases.

For example, the ordinary and common function of transaction processing systems, e.g., matching systems, with an exchange computing system may be to match, or attempt to match, counter-pairs of offers as quickly as possible. Typical match engines match counter-pairs of offers continuously and in real time, as quickly as possible, upon detecting that the offers can match. The particular implementation of the disclosed transaction suspension system differs drastically from typical exchange computing matching systems by blocking or delaying, in a specific manner, incoming messages that trigger or satisfy known patterns, denying the incoming message from matching against a resting order with which the incoming message would have otherwise matched. In one embodiment, if the incoming order, which satisfies the known pattern, is delayed, and if the resting order (with which the incoming message would have otherwise matched) remains on the book for the duration of the delay, the incoming order may match with the resting order upon expiration of the delay period. Thus, the disclosed transaction suspension system may introduce discontinuities or disruptions, e.g., temporal discontinuities, to the otherwise continuous matching process.

In other words, pairs of orders that appear to be matching counteroffers or counterparts of each other may be prevented from matching. Common exchange computing systems fail to recognize deleterious message patterns or messages and prevent their effects on the order book. In contrast, the disclosed transaction suspension system recognizes messages which form harmful or undesirable patterns, and suspends, delays, deletes or totally prevents them from modifying data objects representing order books for the electronic marketplace for the associated financial instruments.

The disclosed embodiments are accordingly directed to a particular implementation of detecting messages or message patterns and suspending or preventing the impact of said messages on an electronic marketplace. At least some of the problems solved by the disclosed transaction suspension system are specifically rooted in technology, specifically in data communications where multiple messages are communicated by multiple sources, e.g., multiple customer computers, over a computer network to a central counterparty, e.g., an exchange computing system that attempts to match customer messages, but where the sources are anonymous to each other. Thus, the data transaction processing system does not transmit data identifying the source of messages to any other source. The sources, from the perspective of the transaction processing system, also act independently and arbitrarily of one another.

In one embodiment, the transaction suspension system is a particular practical and technological solution for a centralized processing system that receives arbitrary/unpredictable inputs from multiple sources, whose identities are kept private and confidential by the exchange computing system. Such technologically rooted problems may be solved by means of a technical solution, the identification of harmful messages and/or message patterns and suspension/prevention of processing those messages even when the system in question is designed specifically to process such messages. The disclosed embodiments solve a problem arising in anonymous trading and transaction processing, where only a central counterparty is privy to the identities of message senders, or to message sources, but where the sources or message senders cannot know each others' identities, or where the data transaction processing system does not share identification information about sources with each other, and where a single source or message sender may be able to submit message patterns over a network that cannot be detected or otherwise avoided, without the disclosed message pattern detection and transaction suspension system.

It should be appreciated that the sources may know of each others' identities outside of the data transaction processing system, or they may become aware of each others' identities. However, the data transaction processing system operates under the assumption that information about one source should not be shared with any other source, and accordingly safeguards such information, and does not transmit such identification information about one source with any other source. The data transaction processing system does not transmit data about the source of any one message with any other source.

The transaction processing system attempts to maintain an order book as an electronic representation of the true intent of the participants, as observed by the system via the objective messages transmitted to the system by the participants, which may be based on the state of the order book and/or other information available to the participant. However, some participants may attempt to conceal their true intent via patterns of messages, which individually provide no indication thereof, but collectively cause the state of the order book to deviate from an accurate representation of participant intent, which may then mislead other participants.

In a financial exchange implemented in an exchange computing system, unnecessary suspensions can be detrimental to market operation and trader expectations. By detecting message patterns, instead of only individual messages, the transaction suspension system can more readily avoid false alarms that would otherwise be triggered if only individual messages were analyzed for undesirable characteristics. The transaction suspension system is more discriminatory in its application over typical matching computing systems, resulting in more accurate identification of undesirable behavior and thereby reducing inappropriate suspension of legitimate transactions. In particular, the transaction suspension system may detect messaging patterns which create misleading or otherwise incorrect/inaccurate market/order-book states, i.e. states which are not reflective of the true intent of the participants.

Accordingly the resulting problem is a problem arising in computer systems due to anonymous trading, e.g., only a central counterparty such as an exchange computing system can detect message sources or senders, and anonymous transaction processing. The solutions disclosed herein are, in one embodiment, implemented as automatic responses and actions by an exchange computing system computer.

For example, one exemplary environment where message pattern detection and mitigation is desirable is in financial markets, and in particular, electronic financial exchanges, such as a futures exchange, such as the Chicago Mercantile Exchange Inc. (CME).

A financial instrument trading system, such as a futures exchange, such as the Chicago Mercantile Exchange Inc. (CME), provides a contract market where financial instruments, e.g., futures and options on futures, are traded using electronic systems. "Futures" is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option contract is the right, but not the obligation, to sell or buy the underlying instrument (in this case, a futures contract) at a specified price within a specified time. The commodity to be delivered in fulfillment of the contract, or alternatively the commodity for which the cash market price shall determine the final settlement price of the futures contract, is known as the contract's underlying reference or "underlier." The terms and conditions of each futures contract are standardized as to the specification of the contract's underlying reference commodity, the quality of such commodity, quantity, delivery date, and means of contract settlement. Cash settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price. Options and futures may be based on more generalized market indicators, such as stock indices, interest rates, futures contracts and other derivatives.

An exchange may provide for a centralized "clearing house" through which trades made must be confirmed, matched, and settled each day until offset or delivered. The clearing house may be an adjunct to an exchange, and may be an operating division of an exchange, which is responsible for settling trading accounts, clearing trades, collecting and maintaining performance bond funds, regulating delivery, and reporting trading data. One of the roles of the clearing house is to mitigate credit risk. Clearing is the procedure through which the clearing house becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the clearing house.

An exchange computing system may operate under a central counterparty model, where the exchange acts as an intermediary between market participants for the transaction of financial instruments. In particular, the exchange computing system novates itself into the transactions between the market participants, i.e., splits a given transaction between the parties into two separate transactions where the exchange computing system substitutes itself as the counterparty to each of the parties for that part of the transaction, sometimes referred to as a novation. In this way, the exchange computing system acts as a guarantor and central counterparty and there is no need for the market participants to disclose their identities to each other, or subject themselves to credit or other investigations by a potential counterparty. For example, the exchange computing system insulates one market participant from the default by another market participant. Market participants need only meet the requirements of the exchange computing system. Anonymity among the market participants encourages a more liquid market environment as there are lower barriers to participation. The exchange computing system can accordingly offer benefits such as centralized and anonymous matching and clearing.

An exchange provides one or more markets for the purchase and sale of various types of products including financial instruments such as stocks, bonds, futures contracts, options, currency, cash, and other similar instruments. Agricultural products and commodities are also examples of products traded on such exchanges. A futures contract is a product that is a contract for the future delivery of another financial instrument such as a quantity of grains, metals, oils, bonds, currency, or cash. Generally, each exchange establishes a specification for each market provided thereby that defines at least the product traded in the market, minimum quantities that must be traded, and minimum changes in price (e.g., tick size). For some types of products (e.g., futures or options), the specification further defines a quantity of the underlying product represented by one unit (or lot) of the product, and delivery and expiration dates. As will be described, the exchange may further define the matching algorithm, or rules, by which incoming orders will be matched/allocated to resting orders.

Market participants, e.g., traders, use software to send orders or messages to the trading platform. The order identifies the product, the quantity of the product the trader wishes to trade, a price at which the trader wishes to trade the product, and a direction of the order (i.e., whether the order is a bid, i.e., an offer to buy, or an ask, i.e., an offer to sell). It will be appreciated that there may be other order types or messages that traders can send including requests to modify or cancel a previously submitted order.

The disclosed embodiments recognize that electronic messages such as incoming messages from market participants, i.e., "outright" messages, e.g., trade order messages, etc., are sent from client devices associated with market participants, or their representatives, to an electronic trading or market system. For example, a market participant may submit an electronic message to the electronic trading system that includes an associated specific action to be undertaken by the electronic trading system, such as entering a new trade order into the market or modifying an existing order in the market. In one embodiment, if a participant wishes to modify a previously sent request, e.g., a prior order which has not yet been processed or traded, they may send a request message comprising a request to modify the prior request.

As used herein, a financial message, or an electronic message, refers both to messages communicated by market participants to an electronic trading or market system and vice versa. The messages may be communicated using packeting or other techniques operable to communicate information between systems and system components. Some messages may be associated with actions to be taken in the electronic trading or market system.

Financial messages communicated to the electronic trading system, also referred to as "inbound" messages, may include associated actions that characterize the messages, such as trader orders, order modifications, order cancellations and the like, as well as other message types. Inbound messages may be sent from market participants, or their representatives, e.g., trade order messages, etc., to an electronic trading or market system. For example, a market participant may submit an electronic message to the electronic trading system that includes an associated specific action to be undertaken by the electronic trading system, such as entering a new trade order into the market or modifying an existing order in the market. In one exemplary embodiment, the incoming request itself, e.g., the inbound order entry, may be referred to as an iLink message. iLink is a bidirectional communications/message protocol/message format implemented by the Chicago Mercantile Exchange Inc.

Financial messages communicated from the electronic trading system, referred to as "outbound" messages, may include messages responsive to inbound messages, such as confirmation messages, or other messages such as market update messages, quote messages, and the like. Outbound messages may be disseminated via data feeds.

Financial messages may further be categorized as having or reflecting an impact on a market or electronic marketplace, also referred to as an "order book" or "book," for a traded product, such as a prevailing price therefore, number of resting orders at various price levels and quantities thereof, etc., or not having or reflecting an impact on a market or a subset or portion thereof. In one embodiment, an electronic order book may be understood to be an electronic collection of the outstanding or resting orders for a financial instrument.

For example, a request to place a trade may result in a response indicative of the trade either being matched with, or being rested on an order book to await, a suitable counter-order. This response may include a message directed solely to the trader who submitted the order to acknowledge receipt of the order and report whether it was matched, and the extent thereto, or rested. The response may further include a message to all market participants reporting a change in the order book due to the order. This response may take the form of a report of the specific change to the order book, e.g., an order for quantity X at price Y was added to the book (referred to, in one embodiment, as a Market By Order message), or may simply report the result, e.g., price level Y now has orders for a total quantity of Z (where Z is the sum of the previous resting quantity plus quantity X of the new order). In some cases, requests may elicit a non-impacting response, such as temporally proximate to the receipt of the request, and then cause a separate market-impact reflecting response at a later time. For example, a stop order, fill or kill order, also known as an immediate or cancel order, or other conditional request may not have an immediate market impacting effect, if at all, until the requisite conditions are met.

In one embodiment, the disclosed system may include a Market Segment Gateway ("MSG") that is the point of ingress/entry and/or egress/departure for all transactions, i.e., the network traffic/packets containing the data therefore. The electronic trading system may include multiple MSGs, one for each market/product implemented thereby, where each MSG is specific to a single market at which the order of receipt of those transactions may be ascribed. Or, the electronic trading system may include one MSG for all the products implemented thereby. For example, a participant may send a request for a new transaction, e.g., a request for a new order, to the MSG. The MSG extracts or decodes the request message and determines the characteristics of the request message.

The MSG may include, or otherwise be coupled with, a buffer, cache, memory, database, content addressable memory, data store or other data storage mechanism, or combinations thereof, which stores data indicative of the characteristics of the request message. The request is passed to the transaction processing system, e.g., the match engine.

An MSG or Market Segment Gateway may be utilized for the purpose of deterministic operation of the market. Transactions for a particular market may be ultimately received at the electronic trading system via one or more points of entry, e.g., one or more communications interfaces, at which the disclosed embodiments apply determinism, which as described may be at the point where matching occurs, e.g., at each match engine (where there may be multiple match engines, each for a given product/market, or moved away from the point where matching occurs and closer to the point where the electronic trading system first becomes "aware" of the incoming transaction, such as the point where transaction messages, e.g., orders, ingress the electronic trading system. Generally, the terms "determinism" or "transactional determinism" may refer to the processing, or the appearance thereof, of orders in accordance with defined business rules. Accordingly, as used herein, the point of determinism may be the point at which the electronic trading system ascribes an ordering to incoming transactions/orders relative to other incoming transactions/orders such that the ordering may be factored into the subsequent processing, e.g., matching, of those transactions/orders as will be described. For more detail on deterministic operation in a trading system, see U.S. patent application Ser. No. 14/074,675, filed on Nov. 7, 2013, published as U.S. Patent Publication No. 2015/0127516, entitled "Transactionally Deterministic High Speed Financial Exchange Having Improved, Efficiency, Communication, Customization, Performance, Access, Trading Opportunities, Credit Controls, And Fault Tolerance", the entirety of which is incorporated by reference herein and relied upon.

Electronic trading of financial instruments, such as futures contracts, is conducted by market participants sending orders, such as to buy or sell one or more futures contracts, in electronic form to the exchange. These electronically submitted orders to buy and sell are then matched, if possible, by the exchange, i.e., by the exchange's matching engine, to execute a trade. Outstanding (unmatched, wholly unsatisfied/unfilled or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data feeds. An order book is typically maintained for each product, e.g., instrument, traded on the electronic trading system and generally defines or otherwise represents the state of the market for that product, i.e., the current prices at which the market participants are willing buy or sell that product. As such, as used herein, an order book for a product may also be referred to as a market for that product.

Upon receipt of an incoming order to trade in a particular financial instrument, whether for a single-component financial instrument, e.g., a single futures contract, or for a multiple-component financial instrument, e.g., a combination contract such as a spread contract, a match engine, as described herein, will attempt to identify a previously received but unsatisfied order counter thereto, i.e., for the opposite transaction (buy or sell) in the same financial instrument at the same or better price (but not necessarily for the same quantity unless, for example, either order specifies a condition that it must be entirely filled or not at all).

Previously received but unsatisfied orders, i.e., orders which either did not match with a counter order when they were received or their quantity was only partially satisfied, referred to as a partial fill, are maintained by the electronic trading system in an order book database/data structure to await the subsequent arrival of matching orders or the occurrence of other conditions which may cause the order to be modified or otherwise removed from the order book.

If the match engine identifies one or more suitable previously received but unsatisfied counter orders, they, and the incoming order, are matched to execute a trade there between to at least partially satisfy the quantities of one or both the incoming order or the identified orders. If there remains any residual unsatisfied quantity of the identified one or more orders, those orders are left on the order book with their remaining quantity to await a subsequent suitable counter order, i.e., to rest. If the match engine does not identify a suitable previously received but unsatisfied counter order, or the one or more identified suitable previously received but unsatisfied counter orders are for a lesser quantity than the incoming order, the incoming order is placed on the order book, referred to as "resting", with original or remaining unsatisfied quantity, to await a subsequently received suitable order counter thereto. The match engine then generates match event data reflecting the result of this matching process. Other components of the electronic trading system, as will be described, then generate the respective order acknowledgment and market data messages and transmit those messages to the market participants.

Matching, which is a function typically performed by the exchange, is a process, for a given order which specifies a desire to buy or sell a quantity of a particular instrument at a particular price, of seeking/identifying one or more wholly or partially, with respect to quantity, satisfying counter orders thereto, e.g., a sell counter to an order to buy, or vice versa, for the same instrument at the same, or sometimes better, price (but not necessarily the same quantity), which are then paired for execution to complete a trade between the respective market participants (via the exchange) and at least partially satisfy the desired quantity of one or both of the order and/or the counter order, with any residual unsatisfied quantity left to await another suitable counter order, referred to as "resting." A match event may occur, for example, when an aggressing order matches with a resting order. In one embodiment, two orders match because one order includes instructions for or specifies buying a quantity of a particular instrument at a particular price, and the other order includes instructions for or specifies selling a (different or same) quantity of the instrument at a same or better price.

While the disclosed embodiments will be described with respect to a product by product or market by market implementation, e.g. implemented for each market/order book, it will be appreciated that the disclosed embodiments may be implemented so as to apply across markets for multiple products traded on one or more electronic trading systems, such as by monitoring an aggregate, correlated or other derivation of the relevant indicative parameters as described herein.

While the disclosed embodiments may be discussed in relation to futures and/or options on futures trading, it should be appreciated that the disclosed embodiments may be applicable to any equity, fixed income security, currency, commodity, options or futures trading system or market now available or later developed. It should be appreciated that a trading environment, such as a futures exchange as described herein, implements one or more economic markets where rights and obligations may be traded. As such, a trading environment may be characterized by a need to maintain market integrity, transparency, predictability, fair/ equitable access and participant expectations with respect thereto. For example, an exchange must respond to inputs, such as trader orders, cancellations, etc., in a manner as expected by the market participants, such as based on market data, e.g., prices, available counter-orders, etc., to provide an expected level of certainty that transactions will occur in a consistent and predictable manner and without unknown or unascertainable risks. In addition, it should be appreciated that electronic trading systems further impose additional expectations and demands by market participants as to transaction processing speed, latency, capacity and response time, while creating additional complexities relating thereto. Accordingly, as will be described, the disclosed embodiments may further include functionality to ensure that the expectations of market participants are met, e.g., that transactional integrity and predictable system responses are maintained.

As was discussed above, electronic trading systems ideally attempt to offer an efficient, fair and balanced market where market prices reflect a true consensus of the value of products traded among the market participants, where the intentional or unintentional influence of any one market participant is minimized if not eliminated, and where unfair or inequitable advantages with respect to information access are minimized if not eliminated.

Financial instrument trading systems allow traders to submit orders and receive confirmations, market data, and other information electronically via electronic messages exchanged using a network. Electronic trading systems ideally attempt to offer a more efficient, fair and balanced market where market prices reflect a true consensus of the value of traded products among the market participants, where the intentional or unintentional influence of any one market participant is minimized if not eliminated, and where unfair or inequitable advantages with respect to information access are minimized if not eliminated.

Electronic marketplaces attempt to achieve these goals by using electronic messages to communicate actions and related data of the electronic marketplace between market participants, clearing firms, clearing houses, and other parties. The messages can be received using an electronic trading system, wherein an action or transaction associated with the messages may be executed. For example, the message may contain information relating to an order to buy or sell a product in a particular electronic marketplace, and the action associated with the message may indicate that the order is to be placed in the electronic marketplace such that other orders which were previously placed may potentially be matched to the order of the received message. Thus the electronic marketplace may conduct market activities through electronic systems.

The clearing house of an exchange clears, settles and guarantees matched transactions in contracts occurring through the facilities of the exchange. In addition, the clearing house establishes and monitors financial requirements for clearing members and conveys certain clearing privileges in conjunction with the relevant exchange markets.

As discussed above, the exchange computing system offers centralized and anonymous matching and clearing so that market participants are not able to identify other market participants, or determine how many transactions other parties have been party to, or whether multiple transactions are all related to or originated from the same market participant or same source.

The clearing house establishes clearing level performance bonds (margins) for all products of the exchange and establishes minimum performance bond requirements for customers of such products. A performance bond, also referred to as a margin requirement, corresponds with the funds that must be deposited by a customer with his or her broker, by a broker with a clearing member or by a clearing member with the clearing house, for the purpose of insuring the broker or clearing house against loss on open futures or options contracts. This is not a part payment on a purchase. The performance bond helps to ensure the financial integrity of brokers, clearing members and the exchange as a whole. The performance bond refers to the minimum dollar deposit required by the clearing house from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e., a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance.

The exchange derives its financial stability in large part by removing debt obligations among market participants as they occur. This is accomplished by determining a settlement price at the close of the market each day for each contract and marking all open positions to that price, referred to as "mark to market." Every contract is debited or credited based on that trading session's gains or losses. As prices move for or against a position, funds flow into and out of the trading account. In the case of the CME, each business day by 6:40 a.m. Chicago time, based on the mark-to-the-market of all open positions to the previous trading day's settlement price, the clearing house pays to or collects cash from each clearing member. This cash flow, known as settlement variation, is performed by CME's settlement banks based on instructions issued by the clearing house. All payments to and collections from clearing members are made in "same-day" funds. In addition to the 6:40 a.m. settlement, a daily intra-day mark-to-the market of all open positions, including trades executed during the overnight GLOBEX®, the CME's electronic trading systems, trading session and the current day's trades matched before 11:15 a.m., is performed using current prices. The resulting cash payments are made intra-day for same day value. In times of extreme price volatility, the clearing house has the authority to perform additional intra-day mark-to-the-market calculations on open positions and to call for immediate payment of settlement variation. CME's mark-to-the-market settlement system differs from the settlement systems implemented by many other financial markets, including the interbank, Treasury securities, over-the-counter foreign exchange and debt, options, and equities markets, where participants regularly assume credit exposure to each other. In those markets, the failure of one participant can have a ripple effect on the solvency of the other participants. Conversely, CME's mark-to-the-market system does not allow losses to accumulate over time or allow a market participant the opportunity to defer losses associated with market positions.

While the disclosed embodiments may be described in reference to the CME, it should be appreciated that these embodiments are applicable to any exchange. Such other exchanges may include a clearing house that, like the CME clearing house, clears, settles and guarantees all matched transactions in contracts of the exchange occurring through its facilities. In addition, such clearing houses establish and monitor financial requirements for clearing members and convey certain clearing privileges in conjunction with the relevant exchange markets.

The disclosed embodiments are also not limited to uses by a clearing house or exchange for purposes of enforcing a performance bond or margin requirement. For example, a market participant may use the disclosed embodiments in a simulation or other analysis of a portfolio. In such cases, the settlement price may be useful as an indication of a value at risk and/or cash flow obligation rather than a performance bond. The disclosed embodiments may also be used by market participants or other entities to forecast or predict the effects of a prospective position on the margin requirement of the market participant.

The embodiments may be described in terms of a distributed computing system. The particular examples identify a specific set of components useful in a futures and options exchange. However, many of the components and inventive features are readily adapted to other electronic trading environments. The specific examples described herein may teach specific protocols and/or interfaces, although it should be understood that the principles involved may be extended to, or applied in, other protocols and interfaces.

It should be appreciated that the plurality of entities utilizing or involved with the disclosed embodiments, e.g., the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

An exemplary trading network environment for implementing trading systems and methods is shown in FIG. 1A. An exchange computer system 100 receives messages that include orders and transmits market data related to orders and trades to users, such as via wide area network 126 and/or local area network 124 and computer devices 114, 116, 118, 120 and 122, as described herein, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

Figure 2:
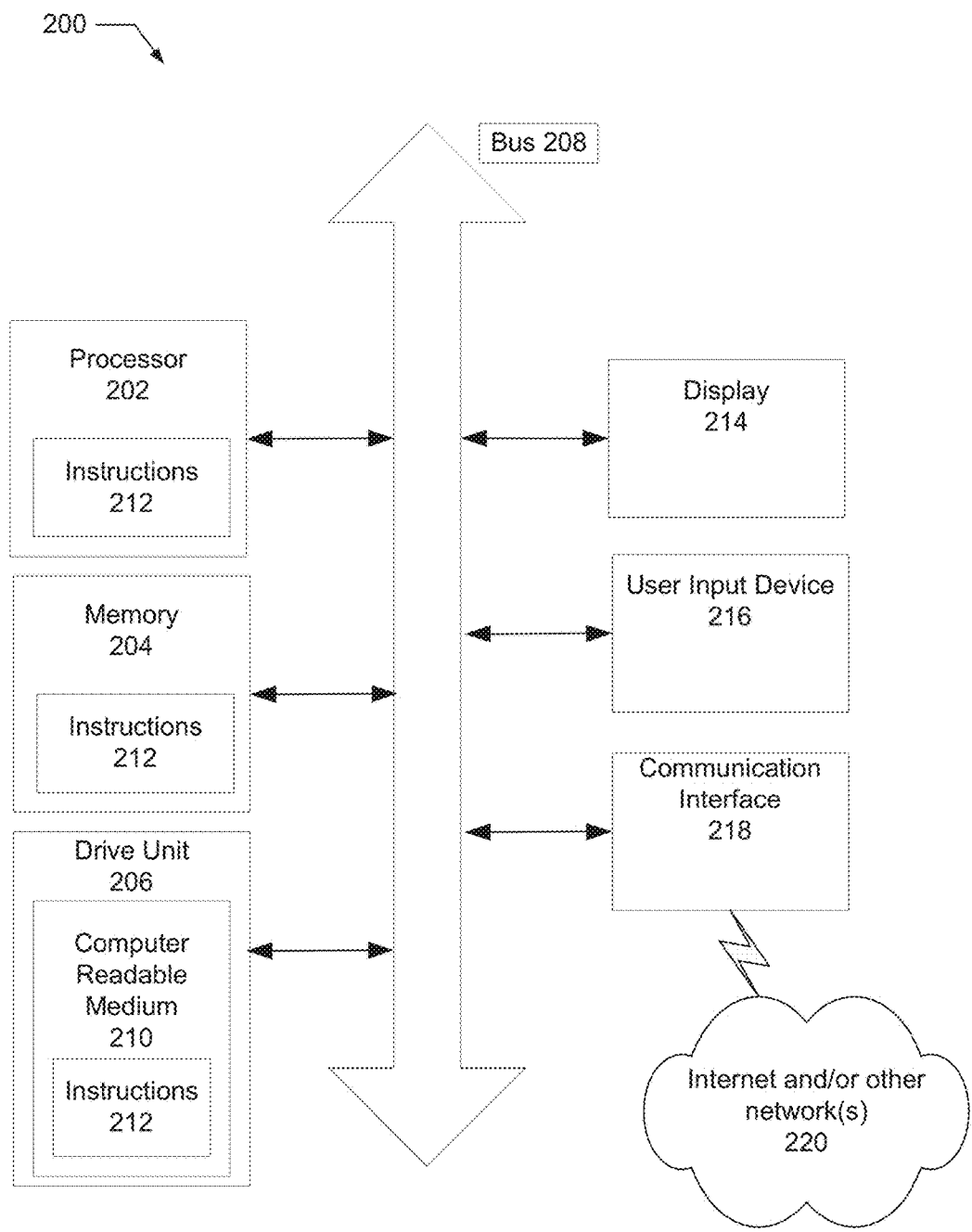
FIG. 2 depicts an illustrative embodiment of a general computer system for use with the disclosed embodiments.

The exchange computer system 100 may be implemented with one or more mainframe, desktop or other computers, such as the example computer 200 described herein with respect to FIG. 2. A user database 102 may be provided which includes information identifying traders and other users of exchange computer system 100, such as account numbers or identifiers, user names and passwords. An account data module 104 may be provided which may process account information that may be used during trades.

A match engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices, e.g., in a continuous auction market, or also operate as an order accumulation buffer for a batch auction market.

A market data module 112 may be included to collect market data and prepare the data for transmission to users.

A risk management module 134 may be included to compute and determine a user's risk utilization in relation to the user's defined risk thresholds. The risk management module 134 may also be configured to determine risk assessments or exposure levels in connection with positions held by a market participant.

The risk management module 134 may be configured to administer, manage or maintain one or more margining mechanisms implemented by the exchange computer system 100. Such administration, management or maintenance may include managing a number of database records reflective of margin accounts of the market participants. In some embodiments, the risk management module 134 implements one or more aspects of the disclosed embodiments, including, for instance, principal component analysis (PCA) based margining, in connection with interest rate swap (IRS) portfolios, as described herein.

An order processing module 136 may be included to decompose delta-based, spread instrument, bulk and other types of composite orders for processing by the order book module 110 and/or the match engine module 106. The order processing module 136 may also be used to implement one or more procedures related to clearing an order.

A message management module 140 may be included to, among other things, receive, and extract orders from, electronic messages as is indicated with one or more aspects of the disclosed embodiments.

A settlement module 142 (or settlement processor or other payment processor) may be included to provide one or more functions related to settling or otherwise administering transactions cleared by the exchange. Settlement module 142 of the exchange computer system 100 may implement one or more settlement price determination techniques. Settlement-related functions need not be limited to actions or events occurring at the end of a contract term. For instance, in some embodiments, settlement-related functions may include or involve daily or other mark to market settlements for margining purposes. In some cases, the settlement module 142 may be configured to communicate with the trade database 108 (or the memory(ies) on which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement module 142 may be used to determine a mark to market amount on a daily basis during the term of the financial instrument. Such determinations may also be made on a settlement date for the financial instrument for the purposes of final settlement.

In some embodiments, the settlement module 142 may be integrated to any desired extent with one or more of the other modules or processors of the exchange computer system 100. For example, the settlement module 142 and the risk management module 134 may be integrated to any desired extent. In some cases, one or more margining procedures or other aspects of the margining mechanism(s) may be implemented by the settlement module 142.

A transaction suspension module 148 may be included to selectively suspend incoming messages as described herein.

It should be appreciated that concurrent processing limits may be defined by or imposed separately or in combination on one or more of the trading system components, including the user database 102, the account data module 104, the match engine module 106, the trade database 108, the order book module 110, the market data module 112, the risk management module 134, the order processing module 136, the message management module 140, the settlement module 142, transaction suspension module 148, or other component of the exchange computer system 100.

In an embodiment, the message management module 140, as coupled with the order book module 110, may be configured for receiving a plurality of electronic messages, each of the plurality of messages having an associated action to be executed within a designated period of time having a beginning time and an ending time, wherein at least one electronic message of the plurality of electronic messages comprises data representative of a particular time between the beginning and end of the period of time at which the action associated with the at least one electronic message is to be executed. The exchange computer system 100 may then be further configured to execute the action associated with the at least one temporally specific message at the particular time.

Figure 1B:
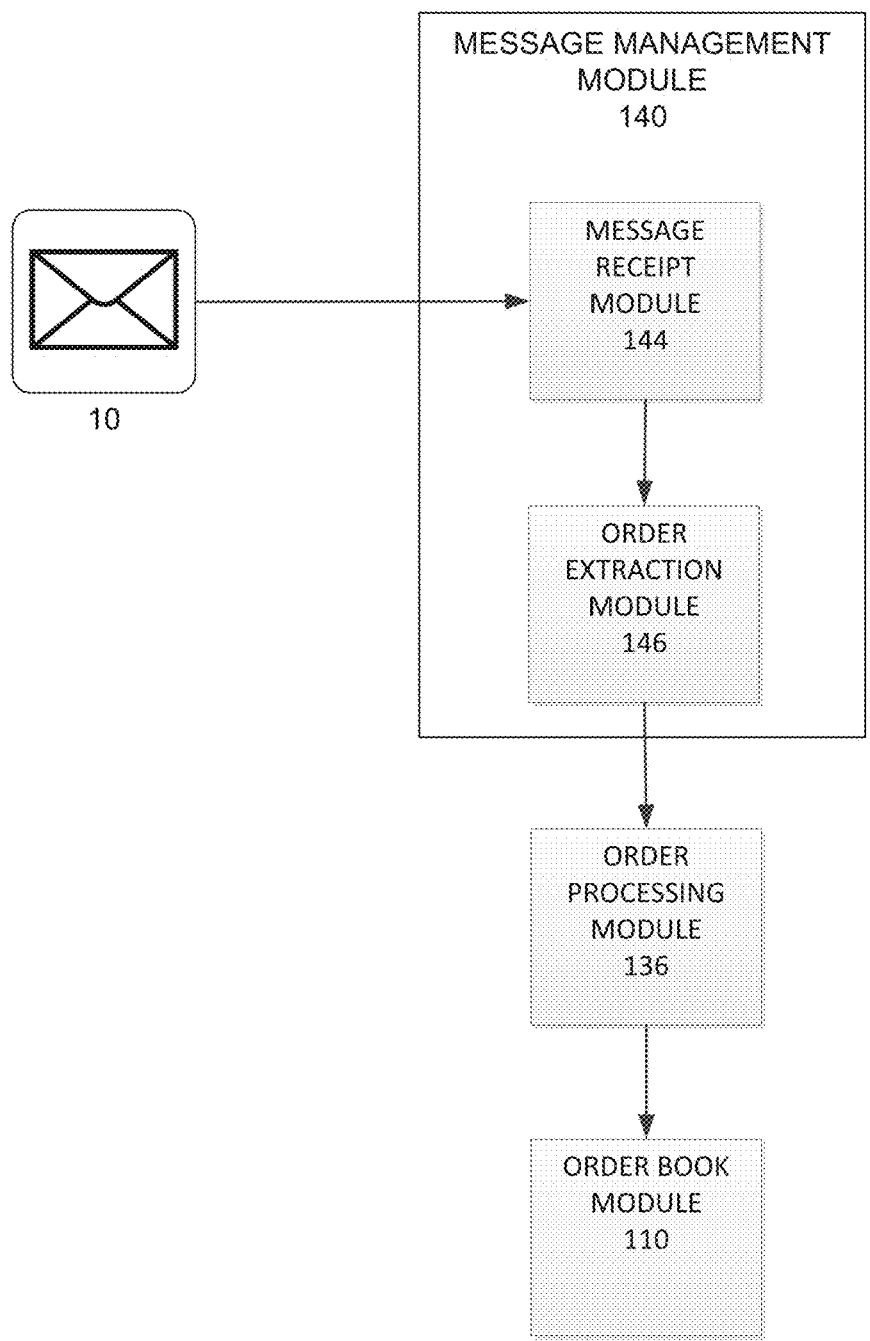
FIG. 1B depicts an example market order message management system for implementing the disclosed embodiments.

The message management module 140 may define a point of ingress into the exchange computer system 100 where messages are ordered and considered to be received by the system. This may be considered a point of determinism in the exchange computer system 100 that defines the earliest point where the system can ascribe an order of receipt to arriving messages. The point of determinism may or may not be at or near the demarcation point between the exchange computer system 100 and a public/internet network infrastructure. FIG. 1B provides additional details for the message management module 140.

As will be described, the disclosed transaction suspension system may be implemented as part of the order processing module 136, match engine module 106 and/or order book module 110. However, it will be appreciated that the disclosed mechanisms may be implemented at any logical and/or physical point(s), or combinations thereof, at which the relevant information/data may be monitored or is otherwise accessible or measurable, including one or more gateway devices, modems, the computers or terminals of one or more market participants, etc.

One skilled in the art will appreciate that one or more modules described herein may be implemented using, among other things, a tangible computer-readable medium comprising computer-executable instructions (e.g., executable software code). Alternatively, modules may be implemented as software code, firmware code, specifically configured hardware or processors, and/or a combination of the aforementioned. For example the modules may be embodied as part of an exchange 100 for financial instruments. It should be appreciated the disclosed embodiments may be implemented as a different or separate module of the exchange computer system 100, or a separate computer system coupled with the exchange computer system 100 so as to have access to margin account record, pricing, and/or other data. As described herein, the disclosed embodiments may be implemented as a centrally accessible system or as a distributed system, e.g., where some of the disclosed functions are performed by the computer systems of the market participants.

As shown in FIG. 1A, the exchange computer system 100 further includes a message management module 140 which may implement, in conjunction with the market data module 112, the disclosed mechanisms for managing electronic messages containing financial data sent between an exchange and a plurality of market participants, or vice versa. However, as was discussed above, the disclosed mechanisms may be implemented at any logical and/or physical point(s) through which the relevant message traffic, and responses thereto, flows or is otherwise accessible, including one or more gateway devices, modems, the computers or terminals of one or more traders, etc.

FIG. 1B illustrates an embodiment of market order message management as implemented using the message management module 140 and order book module 110 of the exchange computer system 100. As such, a message 10 may be received from a market participant at the exchange computer system 100 by a message receipt module 144 of the message management module 140. The message receipt module 144 processes the message 10 by interpreting the content of the message based on the message transmit protocol, such as the transmission control protocol ("TCP"), to provide the content of the message 10 for further processing by the exchange computer system.

For example, the message management module 140 may determine the transaction type of the transaction requested in a given message. A message may include an instruction to perform a type of transaction. The transaction type may be, in one embodiment, a request/offer/order to either buy or sell a specified quantity or units of a financial instrument at a specified price or value.

Further processing may be performed by the order extraction module 146. The order extraction module 146 may be configured to detect, from the content of the message 10 provided by the message receipt module 144, characteristics of an order for a transaction to be undertaken in an electronic marketplace. For example, the order extraction module 146 may identify and extract order content such as a price, product, volume, and associated market participant for an order. The order extraction module 146 may also identify and extract data indicating an action to be executed by the exchange computer system 100 with respect to the extracted order. The order extraction module may also identify and extract other order information and other actions associated with the extracted order. All extracted order characteristics, other information, and associated actions extracted from a message for an order may be collectively considered an order as described and referenced herein.

Order or message characteristics may include, for example, the state of the system after a message is received, arrival time (e.g., the time a message arrives at the MSG or Market Segment Gateway), message type (e.g., new, modify, cancel), and the number of matches generated by a message. Order or message characteristics may also include market participant side (e.g., buy or sell) or time in force (e.g., a good until end of day order that is good for the full trading day, a good until canceled ordered that rests on the order book until matched, or a fill or kill order that is canceled if not filled immediately).

The order may be communicated from the order extraction module 146 to an order processing module 136. The order processing module 136 may be configured to interpret the communicated order, and manage the order characteristics, other information, and associated actions as they are processed through an order book module 110 and eventually transacted on an electronic market. For example, the order processing module 136 may store the order characteristics and other content and execute the associated actions. In an embodiment, the order processing module may execute an associated action of placing the order into an order book for an electronic trading system managed by the order book module 110. In an embodiment, placing an order into an order book and/or into an electronic trading system may be considered a primary action for an order. The order processing module 136 may be configured in various arrangements, and may be configured as part of the order book module 110, part of the message management module 140, or as an independent functioning module.

The embodiments described herein utilize trade related electronic messages such as mass quote messages, individual order messages, modification messages, cancellation messages, etc., so as to enact trading activity in an electronic market. The trading entity and/or market participant may have one or multiple trading terminals associated with the session. Furthermore, the financial instruments may be financial derivative products. Derivative products may include futures contracts, options on futures contracts, futures contracts that are functions of or related to other futures contracts, swaps, swaptions, or other financial instruments that have their price related to or derived from an underlying product, security, commodity, equity, index, or interest rate product. In one embodiment, the orders are for options contracts that belong to a common option class. Orders may also be for baskets, quadrants, other combinations of financial instruments, etc. The option contracts may have a plurality of strike prices and/or comprise put and call contracts. A mass quote message may be received at an exchange. As used herein, an exchange computing system 100 includes a place or system that receives and/or executes orders.

In an embodiment, a plurality of electronic messages is received from the network. The plurality of electronic messages may be received at a network interface for the electronic trading system. The plurality of electronic messages may be sent from market participants. The plurality of messages may include order characteristics and be associated with actions to be executed with respect to an order that may be extracted from the order characteristics. The action may involve any action as associated with transacting the order in an electronic trading system. The actions may involve placing the orders within a particular market and/or order book of a market in the electronic trading system.

In an embodiment, the market may operate using characteristics that involve collecting orders over a period of time, such as a batch auction market. In such an embodiment, the period of time may be considered an order accumulation period. The period of time may involve a beginning time and an ending time, with orders placed in the market after the beginning time, and the placed order matched at or after the ending time. As such, the action associated with an order extracted from a message may involve placing the order in the market within the period of time. Also, electronic messages may be received prior to or after the beginning time of the period of time.

The electronic messages may also include other data relating to the order. In an embodiment, the other data may be data indicating a particular time in which the action is to be executed. As such, the order may be considered a temporally specific order. The particular time in which an action is undertaken may be established with respect to any measure of absolute or relative time. In an embodiment, the time in which an action is undertaken may be established with reference to the beginning time of the time period or ending time of the time period in a batch auction embodiment. For example, the particular time may be a specific amount of time, such as 10 milliseconds, prior to the ending time of an order accumulation period in the batch auction. Further, the order accumulation period may involve dissecting the accumulation period into multiple consecutive, overlapping, or otherwise divided, sub-periods of time. For example, the sub-periods may involve distinct temporal windows within the order accumulation period. As such, the particular time may be an indicator of a particular temporal window during the accumulation period. For example, the particular time may be specified as the last temporal window prior to the ending time of the accumulation period.

In an embodiment, the electronic message may also include other actions to be taken with respect to the order. These other actions may be actions to be executed after the initial or primary action associated with the order. For example, the actions may involve modifying or canceling an already placed order. Further, in an embodiment, the other data may indicate order modification characteristics. For example, the other data may include a price or volume change in an order. The other actions may involve modifying the already placed order to align with the order modification characteristics, such as changing the price or volume of the already placed order.

In an embodiment, other actions may be dependent actions. For example, the execution of the actions may involve a detection of an occurrence of an event. Such triggering events may be described as other data in the electronic message. For example, the triggering event may be a release of an economic statistic from an organization relating to a product being bought or sold in the electronic market, a receipt of pricing information from a correlated electronic market, a detection of a change in market sentiment derived from identification of keywords in social media or public statements of officials related to a product being bought or sold in the electronic market, and/or any other event or combination of events which may be detected by an electronic trading system.

In an embodiment, the action, or a primary action, associated with an order may be executed. For example, an order extracted from electronic message order characteristics may be placed into a market, or an electronic order book for a market, such that the order may be matched with other orders counter thereto.

In an embodiment involving a market operating using batch auction principles, the action, such as placing the order, may be executed subsequent to the beginning time of the order accumulation period, but prior to the ending time of the order accumulation period. Further, as indicated above, a message may also include other information for the order, such as a particular time the action is to be executed. In such an embodiment, the action may be executed at the particular time. For example, in an embodiment involving a batch auction process having sub-periods during an order accumulation period, an order may be placed during a specified sub-period of the order accumulation period. The disclosed embodiments may be applicable to batch auction processing, as well as continuous processing.

Also, it may be noted that messages may be received prior or subsequent to the beginning time of an order accumulation period. Orders extracted from messages received prior to the beginning time may have the associated actions, or primary actions such as placing the order, executed at any time subsequent to the beginning time, but prior to the ending time, of the order accumulation period when no particular time for the execution is indicated in the electronic message. In an embodiment, messages received prior to the beginning time but not having a particular time specified will have the associated action executed as soon as possible after the beginning time. Because of this, specifying a time for order action execution may allow a distribution and more definite relative time of order placement so as to allow resources of the electronic trading system to operate more efficiently.

In an embodiment, the execution of temporally specific messages may be controlled by the electronic trading system such that a limited or maximum number may be executed in any particular accumulation period, or sub-period. In an embodiment, the order accumulation time period involves a plurality of sub-periods involving distinct temporal windows, a particular time indicated by a message may be indicative of a particular temporal window of the plurality of temporal windows, and the execution of the at least one temporally specific message is limited to the execution of a specified sub-period maximum number of temporally specific messages during a particular sub-period. The electronic trading system may distribute the ability to submit temporally specific message to selected market participants. For example, only five temporally specific messages may be allowed in any one particular period or sub-period. Further, the ability to submit temporally specific messages within particular periods or sub-periods may be distributed based on any technique. For example, the temporally specific messages for a particular sub-period may be auctioned off or otherwise sold by the electronic trading system to market participants. Also, the electronic trading system may distribute the temporally specific messages to preferred market participants, or as an incentive to participate in a particular market.

In an embodiment, an event occurrence may be detected. The event occurrence may be the occurrence of an event that was specified as other information relating to an order extracted from an electronic message. The event may be a triggering event for a modification or cancellation action associated with an order. The event may be detected subsequent to the execution of the first action when an electronic message further comprises the data representative of the event and a secondary action associated with the order. In an embodiment involving a market operating on batch auction principles, the event may be detected subsequent to the execution of a first action, placing an order, but prior to the ending time of an order accumulation period in which the action was executed.

In an embodiment, other actions associated with an order may be executed. The other actions may be any action associated with an order. For example, the action may be a conditional action that is executed in response to a detection of an occurrence of an event. Further, in a market operating using batch auction principles, the conditional action may be executed after the placement of an order during an order accumulation period, but in response to a detection of an occurrence of an event prior to an ending time of the order accumulation period. In such an embodiment, the conditional action may be executed prior to the ending time of the order accumulation period. For example, the placed order may be canceled, or modified using other provided order characteristics in the message, in response to the detection of the occurrence of the event.

An event may be a release of an economic statistic or a fluctuation of prices in a correlated market. An event may also be a perceptible change in market sentiment of a correlated market. A change may be perceptible based on a monitoring of orders or social media for keywords in reference to the market in question. For example, electronic trading systems may be configured to be triggered for action by a use of keywords during a course of ongoing public statements of officials who may be in a position to impact markets, such as Congressional testimony of the Chairperson of the Federal Reserve System.

The other, secondary, or supplemental action may also be considered a modification of a first action executed with respect to an order. For example, a cancellation may be considered a cancellation of the placement of the order. Further, a secondary action may have other data in the message which indicates a specific time in which the secondary action may be executed. The specific time may be a time relative to a first action, or placement of the order, or relative to an accumulation period in a batch auction market. For example, the specific time for execution of the secondary action may be at a time specified relative and prior to the ending period of the order accumulation period. Further, multiple secondary actions may be provided for a single order. Also, with each secondary action a different triggering event may be provided.

In an embodiment, an incoming transaction may be received. The incoming transaction may be from, and therefore associated with, a market participant of an electronic market managed by an electronic trading system. The transaction may involve an order as extracted from a received message, and may have an associated action. The actions may involve placing an order to buy or sell a financial product in the electronic market, or modifying or deleting such an order. In an embodiment, the financial product may be based on an associated financial instrument which the electronic market is established to trade.

In an embodiment, the action associated with the transaction is determined. For example, it may be determined whether the incoming transaction comprises an order to buy or sell a quantity of the associated financial instrument or an order to modify or cancel an existing order in the electronic market. Orders to buy or sell and orders to modify or cancel may be acted upon differently by the electronic market. For example, data indicative of different characteristics of the types of orders may be stored.

In an embodiment, data relating to the received transaction is stored. The data may be stored in any device, or using any technique, operable to store and provide recovery of data. For example, a memory 204 or computer readable medium 210, may be used to store data, as is described with respect to FIG. 2 in further detail herein. Data may be stored relating received transactions for a period of time, indefinitely, or for a rolling most recent time period such that the stored data is indicative of the market participant's recent activity in the electronic market.

If and/or when a transaction is determined to be an order to modify or cancel a previously placed, or existing, order, data indicative of these actions may be stored. For example, data indicative of a running count of a number or frequency of the receipt of modify or cancel orders from the market participant may be stored. A number may be a total number of modify or cancel orders received from the market participant, or a number of modify or cancel orders received from the market participant over a specified time. A frequency may be a time based frequency, as in a number of cancel or modify orders per unit of time, or a number of cancel or modify orders received from the market participant as a percentage of total transactions received from the participant, which may or may not be limited by a specified length of time.

If and/or when a transaction is determined to be an order to buy or sell a financial product, or financial instrument, other indicative data may be stored. For example, data indicative of quantity and associated price of the order to buy or sell may be stored.

Data indicative of attempts to match incoming orders may also be stored. The data may be stored in any device, or using any technique, operable to store and provide recovery of data. For example, a memory 204 or computer readable medium 210, may be used to store data, as is described with respect to FIG. 2. The acts of the process as described herein may also be repeated. As such, data for multiple received transactions for multiple market participants may be stored and used as describe herein.

The order processing module 136 may also store data indicative of characteristics of the extracted orders. For example, the order processing module may store data indicative of orders having an associated modify or cancel action, such as by recording a count of the number of such orders associated with particular market participants. The order processing module may also store data indicative of quantities and associated prices of orders to buy or sell a product placed in the market order book 110, as associated with particular market participants.

Also, the order processing module 136 may be configured to calculate and associate with particular orders a value indicative of an associated market participant's market activity quality, which is a value indicative of whether the market participant's market activity increases or tends to increase liquidity of a market. This value may be determined based on the price of the particular order, previously stored quantities of orders from the associated market participant, the previously stored data indicative of previously received orders to modify or cancel as associated with the market participant, and previously stored data indicative of a result of the attempt to match previously received orders stored in association with the market participant. The order processing module 136 may determine or otherwise calculate scores indicative of the quality value based on these stored extracted order characteristics, such as an MQI as described herein.

Further, electronic trading systems may perform actions on orders placed from received messages based on various characteristics of the messages and/or market participants associated with the messages. These actions may include matching the orders either during a continuous auction process, or at the conclusion of a collection period during a batch auction process. The matching of orders may be by any technique.

The matching of orders may occur based on a priority indicated by the characteristics of orders and market participants associated with the orders. Orders having a higher priority may be matched before orders of a lower priority. This priority may be determined using various techniques. For example, orders that were indicated by messages received earlier may receive a higher priority to match than orders that were indicated by messages received later. Also, scoring or grading of the characteristics may provide for priority determination. Data indicative of order matches may be stored by a match engine and/or an order processing module 136, and used for determining MQI scores of market participants.

Generally, a market may involve market makers, such as market participants who consistently provide bids and/or offers at specific prices in a manner typically conducive to balancing risk, and market takers who may be willing to execute transactions at prevailing bids or offers may be characterized by more aggressive actions so as to maintain risk and/or exposure as a speculative investment strategy. From an alternate perspective, a market maker may be considered a market participant who places an order to sell at a price at which there is no previously or concurrently provided counter order. Similarly, a market taker may be considered a market participant who places an order to buy at a price at which there is a previously or concurrently provided counter order. A balanced and efficient market may involve both market makers and market takers, coexisting in a mutually beneficial basis. The mutual existence, when functioning properly, may facilitate liquidity in the market such that a market may exist with "tight" bid-ask spreads (e.g., small difference between bid and ask prices) and a "deep" volume from many currently provided orders such that large quantity orders may be executed without driving prices significantly higher or lower.

As such, both market participant types are useful in generating liquidity in a market, but specific characteristics of market activity taken by market participants may provide an indication of a particular market participant's effect on market liquidity. For example, a Market Quality Index ("MQI") of an order may be determined using the characteristics. An MQI may be considered a value indicating a likelihood that a particular order will improve or facilitate liquidity in a market. That is, the value may indicate a likelihood that the order will increase a probability that subsequent requests and transaction from other market participants will be satisfied. As such, an MQI may be determined based on a proximity of the entered price of an order to a midpoint of a current bid-ask price spread, a size of the entered order, a volume or quantity of previously filled orders of the market participant associated with the order, and/or a frequency of modifications to previous orders of the market participant associated with the order. In this way, an electronic trading system may function to assess and/or assign an MQI to received electronic messages to establish messages that have a higher value to the system, and thus the system may use computing resources more efficiently by expending resources to match orders of the higher value messages prior to expending resources of lower value messages.

While an MQI may be applied to any or all market participants, such an index may also be applied only to a subset thereof, such as large market participants, or market participants whose market activity as measured in terms of average daily message traffic over a limited historical time period exceeds a specified number. For example, a market participant generating more than 500, 1,000, or even 10,000 market messages per day may be considered a large market participant.

The exchange computer system monitors incoming orders received thereby and attempts to identify, i.e., match or allocate, as described herein, one or more previously received, but not yet matched, orders, i.e., limit orders to buy or sell a given quantity at a given price, referred to as "resting" orders, stored in an order book database, wherein each identified order is contra to the incoming order and has a favorable price relative to the incoming order. An incoming order may be an "aggressor" order, i.e., a market order to sell a given quantity at whatever may be the current resting bid order price(s) or a market order to buy a given quantity at whatever may be the current resting ask order price(s). An incoming order may be a "market making" order, i.e., a market order to buy or sell at a price for which there are currently no resting orders. In particular, if the incoming order is a bid, i.e., an offer to buy, then the identified order(s) will be an ask, i.e., an offer to sell, at a price that is identical to or higher than the bid price. Similarly, if the incoming order is an ask, i.e., an offer to sell, the identified order(s) will be a bid, i.e., an offer to buy, at a price that is identical to or lower than the offer price.

An exchange computing system may receive conditional orders or messages for a data object, where the order may include two prices or values: a reference value and a stop value. A conditional order may be configured so that when a product represented by the data object trades at the reference price, the stop order is activated at the stop value. For example, if the exchange computing system's order management module includes a stop order with a stop price of 5 and a limit price of 1 for a product, and a trade at 5 (i.e., the stop price of the stop order) occurs, then the exchange computing system attempts to trade at 1 (i.e., the limit price of the stop order). In other words, a stop order is a conditional order to trade (or execute) at the limit price that is triggered (or elected) when a trade at the stop price occurs.

Stop orders also rest on, or are maintained in, an order book to monitor for a trade at the stop price, which triggers an attempted trade at the limit price. In some embodiments, a triggered limit price for a stop order may be treated as an incoming order.

Upon identification (matching) of a contra order(s), a minimum of the quantities associated with the identified order and the incoming order is matched and that quantity of each of the identified and incoming orders become two halves of a matched trade that is sent to a clearing house. The exchange computer system considers each identified order in this manner until either all of the identified orders have been considered or all of the quantity associated with the incoming order has been matched, i.e., the order has been filled. If any quantity of the incoming order remains, an entry may be created in the order book database and information regarding the incoming order is recorded therein, i.e., a resting order is placed on the order book for the remaining quantity to await a subsequent incoming order counter thereto.

It should be appreciated that in electronic trading systems implemented via an exchange computing system, a trade price (or match value) may differ from (i.e., be better for the submitter, e.g., lower than a submitted buy price or higher than a submitted sell price) the limit price that is submitted, e.g., a price included in an incoming message, or a triggered limit price from a stop order.

As used herein, "better" than a reference value means lower than the reference value if the transaction is a purchase transaction, and higher than the reference value if the transaction is a sell transaction. Said another way, for purchase transactions, lower values are better, and for relinquish or sell transactions, higher values are better.

Traders access the markets on a trading platform using trading software that receives and displays at least a portion of the order book for a market, i.e., at least a portion of the currently resting orders, enables a trader to provide parameters for an order for the product traded in the market, and transmits the order to the exchange computer system. The trading software typically includes a graphical user interface to display at least a price and quantity of some of the entries in the order book associated with the market. The number of entries of the order book displayed is generally preconfigured by the trading software, limited by the exchange computer system, or customized by the user. Some graphical user interfaces display order books of multiple markets of one or more trading platforms. The trader may be an individual who trades on his/her behalf, a broker trading on behalf of another person or entity, a group, or an entity. Furthermore, the trader may be a system that automatically generates and submits orders.

If the exchange computer system identifies that an incoming market order may be filled by a combination of multiple resting orders, e.g., the resting order at the best price only partially fills the incoming order, the exchange computer system may allocate the remaining quantity of the incoming, i.e., that which was not filled by the resting order at the best price, among such identified orders in accordance with prioritization and allocation rules/algorithms, referred to as "allocation algorithms" or "matching algorithms," as, for example, may be defined in the specification of the particular financial product or defined by the exchange for multiple financial products. Similarly, if the exchange computer system identifies multiple orders contra to the incoming limit order and that have an identical price which is favorable to the price of the incoming order, i.e., the price is equal to or better, e.g., lower if the incoming order is a buy (or instruction to purchase) or higher if the incoming order is a sell (or instruction to relinquish), than the price of the incoming order, the exchange computer system may allocate the quantity of the incoming order among such identified orders in accordance with the matching algorithms as, for example, may be defined in the specification of the particular financial product or defined by the exchange for multiple financial products.

An exchange must respond to inputs, such as trader orders, cancellation, etc., in a manner as expected by the market participants, such as based on market data, e.g., prices, available counter-orders, etc., to provide an expected level of certainty that transactions will occur in a consistent and predictable manner and without unknown or unascertainable risks. Accordingly, the method by which incoming orders are matched with resting orders must be defined so that market participants have an expectation of what the result will be when they place an order or have resting orders and an incoming order is received, even if the expected result is, in fact, at least partially unpredictable due to some component of the process being random or arbitrary or due to market participants having imperfect or less than all information, e.g., unknown position of an order in an order book. Typically, the exchange defines the matching/allocation algorithm that will be used for a particular financial product, with or without input from the market participants. Once defined for a particular product, the matching/allocation algorithm is typically not altered, except in limited circumstance, such as to correct errors or improve operation, so as not to disrupt trader expectations. It will be appreciated that different products offered by a particular exchange may use different matching algorithms.

For example, a first-in/first-out (FIFO) matching algorithm, also referred to as a "Price Time" algorithm, considers each identified order sequentially in accordance with when the identified order was received. The quantity of the incoming order is matched to the quantity of the identified order at the best price received earliest, then quantities of the next earliest best price orders, and so on until the quantity of the incoming order is exhausted. Some product specifications define the use of a pro-rata matching algorithm, wherein a quantity of an incoming order is allocated to each of plurality of identified orders proportionally. Some exchange computer systems provide a priority to certain standing orders in particular markets. An example of such an order is the first order that improves a price (i.e., improves the market) for the product during a trading session. To be given priority, the trading platform may require that the quantity associated with the order is at least a minimum quantity. Further, some exchange computer systems cap the quantity of an incoming order that is allocated to a standing order on the basis of a priority for certain markets. In addition, some exchange computer systems may give a preference to orders submitted by a trader who is designated as a market maker for the product. Other exchange computer systems may use other criteria to determine whether orders submitted by a particular trader are given a preference. Typically, when the exchange computer system allocates a quantity of an incoming order to a plurality of identified orders at the same price, the trading host allocates a quantity of the incoming order to any orders that have been given priority. The exchange computer system thereafter allocates any remaining quantity of the incoming order to orders submitted by traders designated to have a preference, and then allocates any still remaining quantity of the incoming order using the FIFO or pro-rata algorithms. Pro-rata algorithms used in some markets may require that an allocation provided to a particular order in accordance with the pro-rata algorithm must meet at least a minimum allocation quantity. Any orders that do not meet or exceed the minimum allocation quantity are allocated to on a FIFO basis after the pro-rata allocation (if any quantity of the incoming order remains). More information regarding order allocation may be found in U.S. Pat. No. 7,853,499, the entirety of which is incorporated by reference herein and relied upon.

Other examples of matching algorithms which may be defined for allocation of orders of a particular financial product include:
  Price Explicit Time
  Order Level Pro Rata
  Order Level Priority Pro Rata
  Preference Price Explicit Time
  Preference Order Level Pro Rata
  Preference Order Level Priority Pro Rata
  Threshold Pro-Rata
  Priority Threshold Pro-Rata
  Preference Threshold Pro-Rata
  Priority Preference Threshold Pro-Rata
  Split Price-Time Pro-Rata For example, the Price Explicit Time trading policy is based on the basic Price Time trading policy with Explicit Orders having priority over Implied Orders at the same price level. The order of traded volume allocation at a single price level may therefore be:
  Explicit order with oldest timestamp first. Followed by
  Any remaining explicit orders in timestamp sequence (First In, First Out—FIFO) next. Followed by
  Implied order with oldest timestamp next. Followed by
  Any remaining implied orders in timestamp sequence (FIFO).

In Order Level Pro Rata, also referred to as Price Pro Rata, priority is given to orders at the best price (highest for a bid, lowest for an offer). If there are several orders at this best price, equal priority is given to every order at this price and incoming business is divided among these orders in proportion to their order size. The Pro Rata sequence of events is:
  1. Extract all potential matching orders at best price from the order book into a list.
  2. Sort the list by order size, largest order size first. If equal order sizes, oldest timestamp first. This is the matching list.
  3. Find the 'Matching order size, which is the total size of all the orders in the matching list.
  4. Find the 'tradable volume', which is the smallest of the matching volume and the volume left to trade on the incoming order.
  5. Allocate volume to each order in the matching list in turn, starting at the beginning of the list. If all the tradable volume gets used up, orders near the end of the list may not get allocation.
  6. The amount of volume to allocate to each order is given by the formula:

(Order volume/Matching volume)*Tradable volume

The result is rounded down (for example, 21.99999999 becomes 21) unless the result is less than 1, when it becomes 1.
  7. If tradable volume remains when the last order in the list had been allocated to, return to step 3.
  Note: The matching list is not re-sorted, even though the volume has changed. The order which originally had the largest volume is still at the beginning of the list.
  8. If there is still volume left to trade on the incoming order, repeat the entire algorithm at the next price level.

Order Level Priority Pro Rata, also referred to as Threshold Pro Rata, is similar to the Price (or 'Vanilla') Pro Rata algorithm but has a volume threshold defined. Any pro rata allocation below the threshold will be rounded down to 0. The initial pass of volume allocation is carried out in using pro rata; the second pass of volume allocation is carried out using Price Explicit Time. The Threshold Pro Rata sequence of events is:
  1. Extract all potential matching orders at best price from the order book into a list.
  2. Sort the list by explicit time priority, oldest timestamp first. This is the matching list.
  3. Find the 'Matching volume', which is the total volume of all the orders in the matching list.
  4. Find the 'tradable volume', which is the smallest of the matching volume and the volume left to trade on the incoming order.
  5. Allocate volume to each order in the matching list in turn, starting at the beginning of the list.
  6. The amount of volume to allocate to each order is given by the formula:

(Order volume/Matching volume)*Tradable volume

The result is rounded down to the nearest lot (for example, 21.99999999 becomes 21) unless the result is less than the defined threshold in which case it is rounded down to 0.
  7. If tradable volume remains when the last order in the list had been allocated to, the remaining volume is allocated in time priority to the matching list.
  8. If there is still volume left to trade on the incoming order, repeat the entire algorithm at the next price level.

In the Split Price Time Pro-Rata algorithms, a Price Time Percentage parameter is defined. This percentage of the matching volume at each price is allocated by the Price Explicit Time algorithm and the remainder is allocated by the Threshold Pro-Rata algorithm. There are four variants of this algorithm, with and without Priority and/or Preference. The Price Time Percentage parameter is an integer between 1 and 99. (A percentage of zero would be equivalent to using the respective existing Threshold Pro-Rata algorithm, and a percentage of 100 would be equivalent to using the respective existing Price Time algorithm). The Price Time Volume will be the residual incoming volume, after any priority and/or Preference allocation has been made, multiplied by the Price Time Percentage. Fractional parts will be rounded up, so the Price Time Volume will always be at least 1 lot and may be the entire incoming volume. The Price Time Volume is allocated to resting orders in strict time priority. Any remaining incoming volume after the Price Time Volume has been allocated will be allocated according to the respective Threshold Pro-Rata algorithm. The sequence of allocation, at each price level, is therefore:

1. Priority order, if applicable
2. Preference allocation, if applicable
3. Price Time allocation of the configured percentage of incoming volume
4. Threshold Pro-Rata allocation of any remaining incoming volume
5. Final allocation of any leftover lots in time sequence.

Any resting order may receive multiple allocations from the various stages of the algorithm.

It will be appreciated that there may be other allocation algorithms, including combinations of algorithms, now available or later developed, which may be utilized with the disclosed embodiments, and all such algorithms are contemplated herein. In one embodiment, the disclosed embodiments may be used in any combination or sequence with the allocation algorithms described herein.

One exemplary system for matching is described in U.S. patent application Ser. No. 13/534,499, filed on Jun. 27, 2012, entitled "Multiple Trade Matching Algorithms," published as U.S. Patent Application Publication No. 2014/0006243 A1, the entirety of which is incorporated by reference herein and relied upon, discloses an adaptive match engine which draws upon different matching algorithms, e.g., the rules which dictate how a given order should be allocated among qualifying resting orders, depending upon market conditions, to improve the operation of the market. For example, for a financial product, such as a futures contract, having a future expiration date, the match engine may match incoming orders according to one algorithm when the remaining time to expiration is above a threshold, recognizing that during this portion of the life of the contract, the market for this product is likely to have high volatility. However, as the remaining time to expiration decreases, volatility may decrease. Accordingly, when the remaining time to expiration falls below the threshold, the match engine switches to a different match algorithm which may be designed to encourage trading relative to the declining trading volatility. Thereby, by conditionally switching among matching algorithms within the same financial product, as will be described, the disclosed match engine automatically adapts to the changing market conditions of a financial product, e.g., a limited life product, in a non-preferential manner, maintaining fair order allocation while improving market liquidity, e.g., over the life of the product.

In one implementation, this trading system may evaluate market conditions on a daily basis and, based thereon, change the matching algorithm between daily trading sessions, i.e., when the market is closed, such that when the market reopens, a new trading algorithm is in effect for the particular product. As will be described, the disclosed embodiments may facilitate more frequent changes to the matching algorithms so as to dynamically adapt to changing market conditions, e.g., intra-day changes, and even intra-order matching changes. It will be further appreciated that hybrid matching algorithms, which match part of an order using one algorithm and another part of the order using a different algorithm, may also be used.

With respect to incoming orders, some traders, such as automated and/or algorithmic traders, attempt to respond to market events, such as to capitalize upon a mispriced resting order or other market inefficiency, as quickly as possible. This may result in penalizing the trader who makes an errant trade, or whose underlying trading motivations have changed, and who cannot otherwise modify or cancel their order faster than other traders can submit trades there against. It may considered that an electronic trading system that rewards the trader who submits their order first creates an incentive to either invest substantial capital in faster trading systems, participate in the market substantially to capitalize on opportunities (aggressor side/lower risk trading) as opposed to creating new opportunities (market making/higher risk trading), modify existing systems to streamline business logic at the cost of trade quality, or reduce one's activities and exposure in the market. The result may be a lesser quality market and/or reduced transaction volume, and corresponding thereto, reduced fees to the exchange.

With respect to resting orders, allocation/matching suitable resting orders to match against an incoming order can be performed, as described herein, in many different ways. Generally, it will be appreciated that allocation/matching algorithms are only needed when the incoming order quantity is less than the total quantity of the suitable resting orders as, only in this situation, is it necessary to decide which resting order(s) will not be fully satisfied, which trader(s) will not get their orders filled. It can be seen from the above descriptions of the matching/allocation algorithms, that they fall generally into three categories: time priority/first-in-first-out ("FIFO"), pro rata, or a hybrid of FIFO and pro rata.

As described above, matching systems apply a single algorithm, or combined algorithm, to all of the orders received for a particular financial product to dictate how the entire quantity of the incoming order is to be matched/allocated. In contrast, the disclosed embodiments may apply different matching algorithms, singular or combined, to different orders, as will be described, recognizing that the allocation algorithms used by the trading host for a particular market may, for example, affect the liquidity of the market. Specifically, some allocation algorithms may encourage traders to submit more orders, where each order is relatively small, while other allocation algorithms encourage traders to submit larger orders. Other allocation algorithms may encourage a trader to use an electronic trading system that can monitor market activity and submit orders on behalf of the trader very quickly and without intervention. As markets and technologies available to traders evolve, the allocation algorithms used by trading hosts must also evolve accordingly to enhance liquidity and price discovery in markets, while maintaining a fair and equitable market.

FIFO generally rewards the first trader to place an order at a particular price and maintains this reward indefinitely. So if a trader is the first to place an order at price X, no matter how long that order rests and no matter how many orders may follow at the same price, as soon as a suitable incoming order is received, that first trader will be matched first. This "first mover" system may commit other traders to positions in the queue after the first move traders. Furthermore, while it may be beneficial to give priority to a trader who is first to place an order at a given price because that trader is, in effect, taking a risk, the longer that the trader's order rests, the less beneficial it may be. For instance, it could deter other traders from adding liquidity to the marketplace at that price because they know the first mover (and potentially others) already occupies the front of the queue.

With a pro rata allocation, incoming orders are effectively split among suitable resting orders. This provides a sense of fairness in that everyone may get some of their order filled. However, a trader who took a risk by being first to place an order (a "market turning" order) at a price may end up having to share an incoming order with a much later submitted order. Furthermore, as a pro rata allocation distributes the incoming order according to a proportion based on the resting order quantities, traders may place orders for large quantities, which they are willing to trade but may not necessarily want to trade, in order to increase the proportion of an incoming order that they will receive. This results in an escalation of quantities on the order book and exposes a trader to a risk that someone may trade against one of these orders and subject the trader to a larger trade than they intended. In the typical case, once an incoming order is allocated against these large resting orders, the traders subsequently cancel the remaining resting quantity which may frustrate other traders. Accordingly, as FIFO and pro rata both have benefits and problems, exchanges may try to use hybrid allocation/matching algorithms which attempt to balance these benefits and problems by combining FIFO and pro rata in some manner. However, hybrid systems define conditions or fixed rules to determine when FIFO should be used and when pro rata should be used. For example, a fixed percentage of an incoming order may be allocated using a FIFO mechanism with the remainder being allocated pro rata.

Traders trading on an exchange including, for example, exchange computer system 100, often desire to trade multiple financial instruments in combination. Each component of the combination may be called a leg. Traders can submit orders for individual legs or in some cases can submit a single order for multiple financial instruments in an exchange-defined combination. Such orders may be called a strategy order, a spread order, or a variety of other names.

A spread instrument may involve the simultaneous purchase of one security and sale of a related security, called legs, as a unit. The legs of a spread instrument may be options or futures contracts, or combinations of the two. Trades in spread instruments are executed to yield an overall net position whose value, called the spread, depends on the difference between the prices of the legs. Spread instruments may be traded in an attempt to profit from the widening or narrowing of the spread, rather than from movement in the prices of the legs directly. Spread instruments are either "bought" or "sold" depending on whether the trade will profit from the widening or narrowing of the spread, respectively. An exchange often supports trading of common spreads as a unit rather than as individual legs, thus ensuring simultaneous execution of the two legs, eliminating the execution risk of one leg executing but the other failing.

One example of a spread instrument is a calendar spread instrument. The legs of a calendar spread instrument differ in delivery date of the underlier. The leg with the earlier occurring delivery date is often referred to as the lead month contract. A leg with a later occurring delivery date is often referred to as a deferred month contract. Another example of a spread instrument is a butterfly spread instrument, which includes three legs having different delivery dates. The delivery dates of the legs may be equidistant to each other. The counterparty orders that are matched against such a combination order may be individual, "outright" orders or may be part of other combination orders.

In other words, an exchange may receive, and hold or let rest on the books, outright orders for individual contracts as well as outright orders for spreads associated with the individual contracts. An outright order (for either a contract or for a spread) may include an outright bid or an outright offer, although some outright orders may bundle many bids or offers into one message (often called a mass quote).

A spread is an order for the price difference between two contracts. This results in the trader holding a long and a short position in two or more related futures or options on futures contracts, with the objective of profiting from a change in the price relationship. A typical spread product includes multiple legs, each of which may include one or more underlying financial instruments. A butterfly spread product, for example, may include three legs. The first leg may consist of buying a first contract. The second leg may consist of selling two of a second contract. The third leg may consist of buying a third contract. The price of a butterfly spread product may be calculated as:

$$\text{Butterfly} = \text{Leg1} - 2 \times \text{Leg2} + \text{Leg3} \quad \text{(equation 1)}$$

In the above equation, Leg1 equals the price of the first contract, Leg2 equals the price of the second contract and Leg3 equals the price of the third contract. Thus, a butterfly spread could be assembled from two inter-delivery spreads in opposite directions with the center delivery month common to both spreads.

A calendar spread, also called an intra-commodity spread, for futures is an order for the simultaneous purchase and sale of the same futures contract in different contract months (i.e., buying a September CME S&P 500® futures contract and selling a December CME S&P 500 futures contract).

A crush spread is an order, usually in the soybean futures market, for the simultaneous purchase of soybean futures and the sale of soybean meal and soybean oil futures to establish a processing margin. A crack spread is an order for a specific spread trade involving simultaneously buying and selling contracts in crude oil and one or more derivative products, typically gasoline and heating oil. Oil refineries may trade a crack spread to hedge the price risk of their operations, while speculators attempt to profit from a change in the oil/gasoline price differential.

A straddle is an order for the purchase or sale of an equal number of puts and calls, with the same strike price and expiration dates. A long straddle is a straddle in which a long position is taken in both a put and a call option. A short straddle is a straddle in which a short position is taken in both a put and a call option. A strangle is an order for the purchase of a put and a call, in which the options have the same expiration and the put strike is lower than the call strike, called a long strangle. A strangle may also be the sale of a put and a call, in which the options have the same expiration and the put strike is lower than the call strike, called a short strangle. A pack is an order for the simultaneous purchase or sale of an equally weighted, consecutive series of four futures contracts, quoted on an average net change basis from the previous day's settlement price. Packs provide a readily available, widely accepted method for executing multiple futures contracts with a single transaction. A bundle is an order for the simultaneous sale or purchase of one each of a series of consecutive futures contracts. Bundles provide a readily available, widely accepted method for executing multiple futures contracts with a single transaction.

Thus an exchange may match outright orders, such as individual contracts or spread orders (which as discussed herein could include multiple individual contracts). The exchange may also imply orders from outright orders. For example, exchange computer system 100 may derive, identify and/or advertise, publish, display or otherwise make available for trading orders based on outright orders.

For example, two different outright orders may be resting on the books, or be available to trade or match. The orders may be resting because there are no outright orders that match the resting orders. Thus, each of the orders may wait or rest on the books until an appropriate outright counteroffer comes into the exchange or is placed by a user of the exchange. The orders may be for two different contracts that only differ in delivery dates. It should be appreciated that such orders could be represented as a calendar spread order. Instead of waiting for two appropriate outright orders to be placed that would match the two existing or resting orders, the exchange computer system may identify a hypothetical spread order that, if entered into the system as a tradable spread order, would allow the exchange computer system to match the two outright orders. The exchange may thus advertise or make available a spread order to users of the exchange system that, if matched with a tradable spread order, would allow the exchange to also match the two resting orders. Thus, the match engine is configured to detect that the two resting orders may be combined into an order in the spread instrument and accordingly creates an implied order.

In other words, the exchange's matching system may imply the counteroffer order by using multiple orders to create the counteroffer order. Examples of spreads include implied IN, implied OUT, 2nd- or multiple-generation, crack spreads, straddle, strangle, butterfly, and pack spreads. Implied IN spread orders are derived from existing outright orders in individual legs. Implied OUT outright orders are derived from a combination of an existing spread order and an existing outright order in one of the individual underlying legs. Implied orders can fill in gaps in the market and allow spreads and outright futures traders to trade in a product where there would otherwise have been little or no available bids and asks.

For example, implied IN spreads may be created from existing outright orders in individual contracts where an outright order in a spread can be matched with other outright orders in the spread or with a combination of orders in the legs of the spread. An implied OUT spread may be created from the combination of an existing outright order in a spread and an existing outright order in one of the individual underlying leg. An implied IN or implied OUT spread may be created when an electronic match system simultaneously works synthetic spread orders in spread markets and synthetic orders in the individual leg markets without the risk to the trader/broker of being double filled or filled on one leg and not on the other leg.

By linking the spread and outright markets, implied spread trading increases market liquidity. For example, a buy in one contract month and an offer in another contract month in the same futures contract can create an implied market in the corresponding calendar spread. An exchange may match an order for a spread product with another order for the spread product. Some existing exchanges attempt to match orders for spread products with multiple orders for legs of the spread products. With such systems, every spread product contract is broken down into a collection of legs and an attempt is made to match orders for the legs. Examples of implied spread trading include those disclosed in U.S. Patent Publication No. 2005/0203826, entitled "Implied Spread Trading System," the entire disclosure of which is incorporated by reference herein and relied upon. Examples of implied markets include those disclosed in U.S. Pat. No. 7,039,610, entitled "Implied Market Trading System," the entire disclosure of which is incorporated by reference herein and relied upon.

As an intermediary to electronic trading transactions, the exchange bears a certain amount of risk in each transaction that takes place. To that end, the clearing house implements risk management mechanisms to protect the exchange. One or more of the modules of the exchange computer system 100 may be configured to determine settlement prices for constituent contracts, such as deferred month contracts, of spread instruments, such as for example, settlement module 142.

One or more of the above-described modules of the exchange computer system 100 may be used to gather or obtain data to support the settlement price determination, as well as a subsequent margin requirement determination. For example, the order book module 110 and/or the market data module 112 may be used to receive, access, or otherwise obtain market data, such as bid-offer values of orders currently on the order books. The trade database 108 may be used to receive, access, or otherwise obtain trade data indicative of the prices and volumes of trades that were recently executed in a number of markets. In some cases, transaction data (and/or bid/ask data) may be gathered or obtained from open outcry pits and/or other sources and incorporated into the trade and market data from the electronic trading system(s).

In some cases, the outright market for the deferred month or other constituent contract may not be sufficiently active to provide market data (e.g., bid-offer data) and/or trade data. Spread instruments involving such contracts may nonetheless be made available by the exchange. The market data from the spread instruments may then be used to determine a settlement price for the constituent contract. The settlement price may be determined, for example, through a boundary constraint-based technique based on the market data (e.g., bid-offer data) for the spread instrument, as described in U.S. Patent Publication No. 2015/0073962 entitled "Boundary Constraint-Based Settlement in Spread Markets" ("the '962 Publication"), the entire disclosure of which is incorporated by reference herein and relied upon. Settlement price determination techniques may be implemented to cover calendar month spread instruments having different deferred month contracts.

The disclosed embodiments may be implemented in a data transaction processing system that processes data items or objects. Customer or user devices (e.g., computers) may submit electronic data transaction request messages, e.g., inbound messages, to the data transaction processing system over a data communication network. The electronic data transaction request messages may include, for example, transaction matching parameters, such as instructions and/or values, for processing the data transaction request messages within the data transaction processing system. The instructions may be to perform transactions, e.g., buy or sell a quantity of a product at a given value. Products, e.g., financial instruments, or order books representing the state of an electronic marketplace for a product, may be represented as data objects within the exchange computing system. The instructions may also be conditional, e.g., buy or sell a quantity of a product at a given value if a trade for the product is executed at some other reference value. The data transaction processing system may include a specifically configured matching processor that matches, e.g., automatically, electronic data transaction request messages for the same one of the data items. The specifically configured matching processor may match electronic data transaction request messages based on multiple transaction matching parameters from the different client computers. The specifically configured matching processor may additionally generate information reported to data recipient computing systems via outbound messages published via one or more data feeds.

The disclosed transaction suspension system may be implemented to automatically perform a corrective action, e.g., suspend, halt or release the matching processor depending on the state of the system and/or the contents of the electronic data transaction request messages. For example, upon detecting an undesirable condition within the data transaction processing system, the transaction suspension system may cause suspending or halting of the matching processor, which prevents the matching processor from matching messages, e.g., places the system or data objects related to the undesirable condition in a reserved state. After the passage of time, receipt of a number of messages, or some other predetermined condition, the transaction suspension system may release the matching processor, or allow the matching processor to resume matching messages.

Figure 3A:
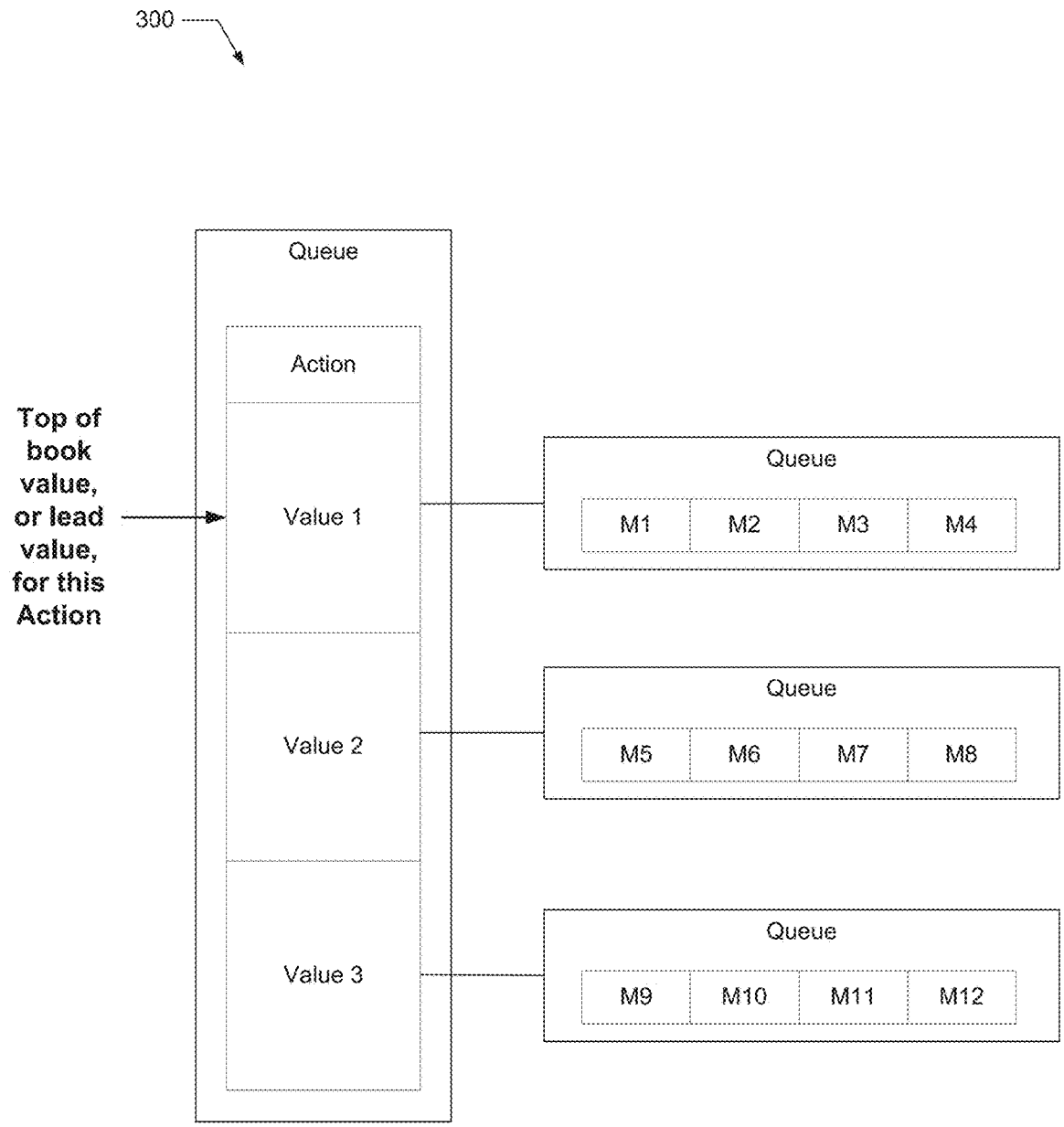
FIG. 3A depicts an illustrative embodiment of a data structure used to implement aspects of the disclosed embodiments.

In one embodiment, the messages and/or values received for each object may be stored in queues according to value and/or priority techniques implemented by an exchange computing system 100. FIG. 3A illustrates an example data structure 300, which may be stored in a memory or other storage device, such as the memory 204 or storage device 206 described with respect to FIG. 2, for storing and retrieving messages related to different values for the same action for an object. For example, data structure 300 may be a set of queues or linked lists for multiple values for an action, e.g., bid, on an object. Data structure 300 may be implemented as a database. It should be appreciated that the system may store multiple values for the same action for an object, for example, because multiple users submitted messages to buy specified quantities of an object at different values. Thus, in one embodiment, the exchange computing system can keep track of different orders or messages for buying or selling quantities of objects at specified values.

Although the application contemplates using queue data structures for storing messages in a memory, the implementation may involve additional pointers, i.e., memory address pointers, or linking to other data structures. Thus, in one embodiment, each queue may store different values, which could represent prices, where each value points to or is linked to the messages (which may themselves be stored in queues and sequenced according to priority techniques, such as prioritizing by value) that will match at that value. For example, as shown in FIG. 3A, all of the values relevant to executing an action at different values for an object are stored in a queue. Each value in turn points to, e.g., a linked list or queue logically associated with the values. The linked list stores the messages that instruct the exchange computing system to buy specified quantities of the object at the corresponding value.

The sequence of the messages in the message queues connected to each value may be determined by exchange implemented priority techniques. For example, in FIG. 3A, messages M1, M2, M3 and M4 are associated with performing an action (e.g., buying or selling) a certain number of units (may be different for each message) at Value 1. M1 has priority over M2, which has priority over M3, which has priority over M4. Thus, if a counter order matches at Value 1, the system fills as much quantity as possible associated with M1 first, then M2, then M3, and then M4.

In the illustrated examples, the values may be stored in sequential order, and the best or lead value for a given queue may be readily retrievable by and/or accessible to components of the exchange computing system. Thus, in one embodiment, the value having the best priority may be illustrated as being in the topmost position in a queue, although the system may be configured to place the best priority message in some other predetermined position. In the example of FIG. 3A, Value 1 is shown as being the best value or lead value, or the top of the book value, for an example Action. In one embodiment components of the exchange computing system may access the top of book information for a given action in a queue, or may access other portions of the queue.

Figure 3B:
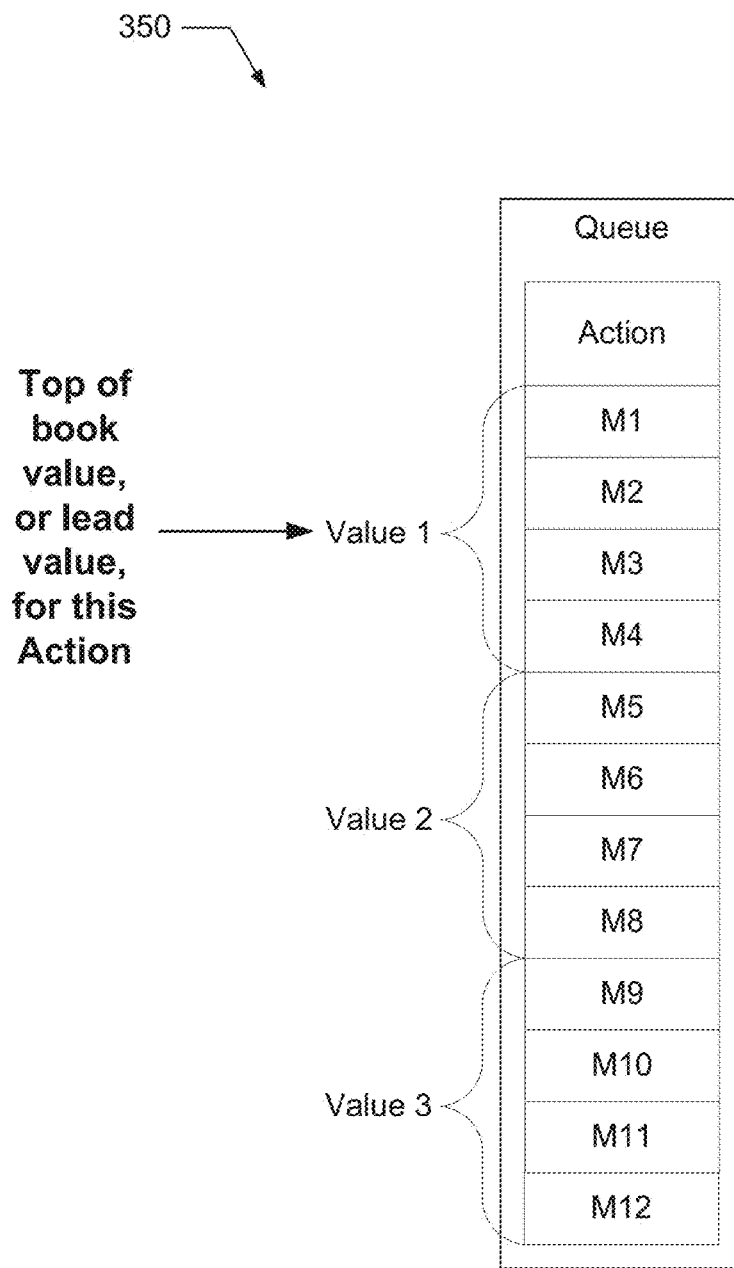
FIG. 3B depicts an illustrative embodiment of an alternative data structure used to implement aspects of the disclosed embodiments.

FIG. 3B illustrates an example alternative data structure 350 for storing and retrieving messages and related values. It should be appreciated that matches occur based on values, and so all the messages related to a given value may be prioritized over all other messages related to a different value. As shown in FIG. 3B, the messages may be stored in one queue and grouped by values according to the hierarchy of the values. The hierarchy of the values may depend on the action to be performed.

For example, if a queue is a sell queue (e.g., the Action is Sell), the lowest value may be given the best priority and the highest value may be given the lowest priority. Thus, as shown in FIG. 3B, if Value 1 is lower than Value 2 which is lower than Value 3, Value 1 messages may be prioritized over Value 2, which in turn may be prioritized over Value 3.

Within Value 1, M1 is prioritized over M2, which in turn is prioritized over M3, which in turn is prioritized over M4. Within Value 2, M5 is prioritized over M6, which in turn is prioritized over M7, which in turn is prioritized over M8. Within Value 3, M9 is prioritized over M10, which in turn is prioritized over M11, which in turn is prioritized over M12.

Alternatively, the messages may be stored in a tree-node data structure that defines the priorities of the messages. In one embodiment, the messages may make up the nodes.

In one embodiment, the system may traverse through a number of different values and associated messages when processing an incoming message. Traversing values may involve the processor loading each value, checking that value and deciding whether to load another value, i.e., by accessing the address pointed at by the address pointer value. In particular, referring to FIG. 3B, if the queue is for selling an object for the listed Values 1, 2 and 3 (where Value 1 is lower than Value 2 which is lower than Value 3), and if the system receives an incoming aggressing order to buy quantity X at a Value 4 that is greater than Values 1, 2, and 3, the system will fill as much of quantity X as possible by first traversing through the messages under Value 1 (in sequence M1, M2, M3, M4). If any of the quantity of X remains, the system traverses down the prioritized queue until all of the incoming order is filled (e.g., all of X is matched) or until all of the quantities of M1 through M12 are filled. Any remaining, unmatched quantity remains on the books, e.g., as a resting order at Value 4, which was the entered value or the message's value.

The system may traverse the queues and check the values in a queue, and upon finding the appropriate value, may locate the messages involved in making that value available to the system. When an outright message value is stored in a queue, and when that outright message is involved in a trade or match, the system may check the queue for the value, and then may check the data structure storing messages associated with that value.

In one embodiment, an exchange computing system may convert all financial instruments to objects. In one embodiment, an object may represent the order book for a financial instrument. Moreover, in one embodiment, an object may be defined by two queues, one queue for each action that can be performed by a user on the object. For example, an order book converted to an object may be represented by an Ask queue and a Bid queue. Resting messages or orders associated with the respective financial instrument may be stored in the appropriate queue and recalled therefrom.

In one embodiment, the messages associated with objects may be stored in specific ways depending on the characteristics of the various messages and the states of the various objects in memory. For example, a system may hold certain resting messages in queue until the message is to be processed, e.g., the message is involved in a match. The order, sequence or priority given to messages may depend on the characteristics of the message. For example, in certain environments, messages may indicate an action that a computer in the system should perform. Actions may be complementary actions, or require more than one message to complete. For example, a system may be tasked with matching messages or actions contained within messages. The messages that are not matched may be queued by the system in a data queue or other structure, e.g., a data tree having nodes representing messages or orders.

The queues are structured so that the messages are stored in sequence according to priority. Although the embodiments are disclosed as being implemented in queues, it should be understood that different data structures such as for example linked lists or trees may also be used.

The system may include separate data structures, e.g., queues, for different actions associated with different objects within the system. For example, in one embodiment, the system may include a queue for each possible action that can be performed on an object. The action may be associated with a value. The system prioritizes the actions based in part on the associated value.

Figure 4:
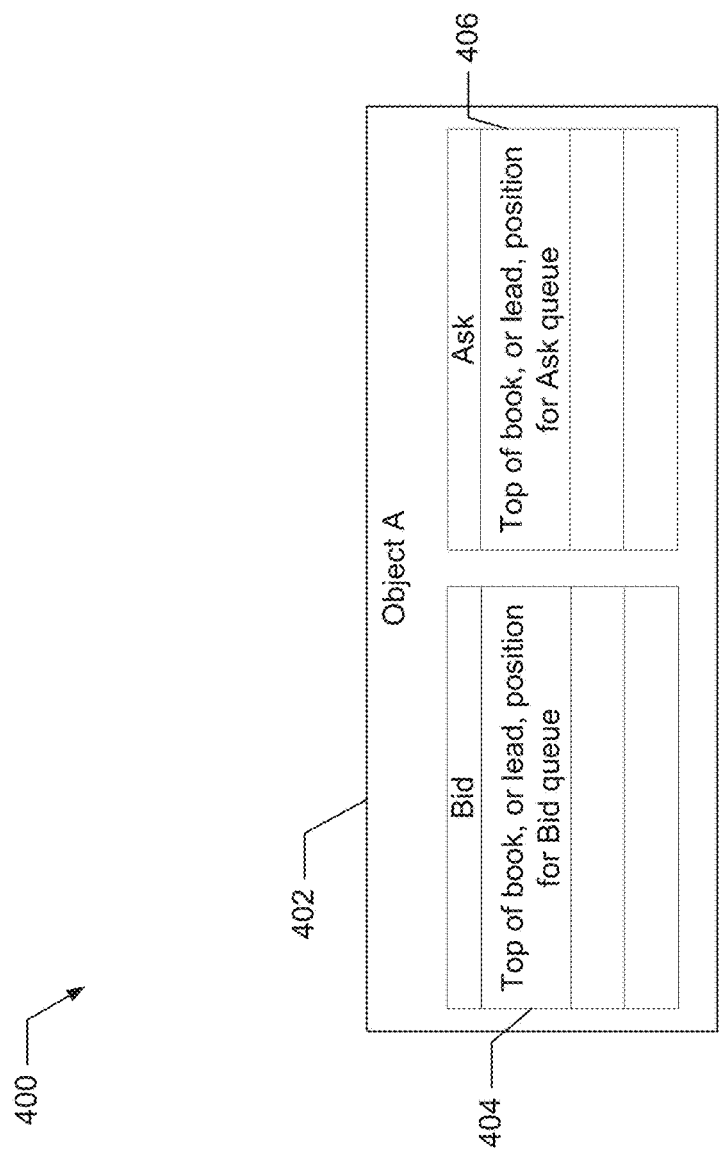
FIG. 4 depicts an illustrative embodiment of data structures holding example messages used to implement aspects of the disclosed embodiments.

For example, as shown in FIG. 4, the order book module of a computing system may include several paired queues, such as queues Bid and Ask for an object (e.g., Object A). The system may include two queues, or one pair of queues, for each object that is matched or processed by the system. In one embodiment, the system stores messages in the queues that have not yet been matched or processed. FIG. 4 may be an implementation of the data structures disclosed in FIGS. 3A and/or 3B. Object A, item 402, may be a data object include two queues storing messages or positions related to messages received for transacting upon Object A, 402. Each queue may have a top of book, or lead, position, such as positions 404 and 406.

The queues may define the priority or sequence in which messages are processed upon a match event. For example, two messages stored in a queue may represent performing the same action at the same value. When a third message is received by the system that represents a matching action at the same value, the system may need to select one of the two waiting, or resting, messages as the message to use for a match. Thus, when multiple messages can be matched at the same value, the exchange may have a choice or some flexibility regarding the message that is matched. The queues may define the priority in which orders that are otherwise equivalent (e.g., same action for the same object at the same value) are processed.

The system may include a pair of queues for each object, e.g., a bid and ask queue for each object. Each queue may be for example implemented utilizing the data structure of FIG. 3B. The exchange may be able to specify the conditions upon which a message for an object should be placed in a queue. For example, the system may include one queue for each possible action that can be performed on an object. The system may be configured to process messages that match with each other. In one embodiment, a message that indicates performing an action at a value may match with a message indicating performing a corresponding action at the same value. Or, the system may determine the existence of a match when messages for the same value exist in both queues of the same object.

The messages may be received from the same or different users or traders, or sources. However, it should be appreciated that sources are anonymous to each other, because of the central counterparty model described above which allows for anonymous centralized trading.

The queues illustrated in FIG. 4 hold or store messages received by a computing exchange, e.g., messages submitted by a user to the computing exchange, and waiting for a proper match. It should be appreciated that the queues may also hold or store implieds, e.g., implied messages generated by the exchange system, such as messages implied in or implied out as described herein. The system thus adds messages to the queues as they are received, e.g., messages submitted by users, or generated, e.g., implied messages generated by the exchanges. The sequence or prioritization of messages in the queues is based on information about the messages and the overall state of the various objects in the system.

An exchange computing system, such as one implemented by the CME, may include a transaction suspension system which tracks messages and their sources and detects undesirable message and matching patterns and suspends or prevents matching upon detecting same.

The exchange computing system may determine that sources are different if they messages are determined to originate from different IP (internet protocol) addresses. Or, the sources may be considered different if the messages are associated with different customer accounts.

In one embodiment, the system may be configured to conclude that orders or messages that originate from the same trading firm are from the same source. Conversely, messages that originate from the same IP address, or that are associated with the same customer account, may be determined to be from the same source.

Additional examples and details of how a system may determine whether messages are transmitted by or originate from the same source or entity are described in U.S. Patent Publication No. 2007/0118460 entitled "Detection of intra-firm matching and response thereto" and filed on Nov. 17, 2006, and U.S. Patent Publication No. 2015/0026033 entitled "Efficient Self-Match Prevention in an Electronic Match Engine" and filed Oct. 3, 2014, both of which are incorporated by reference herein in their entireties and relied upon.

The system may use information from within incoming messages, such as a Tag 50 identifier within the CME Group exchange computing system, which may be a unique identifier associated with an individual submitting the message. Or, the system may use any combination of the account, firm or unique user identifier to determine that messages are from the same source.

Figure 5A:
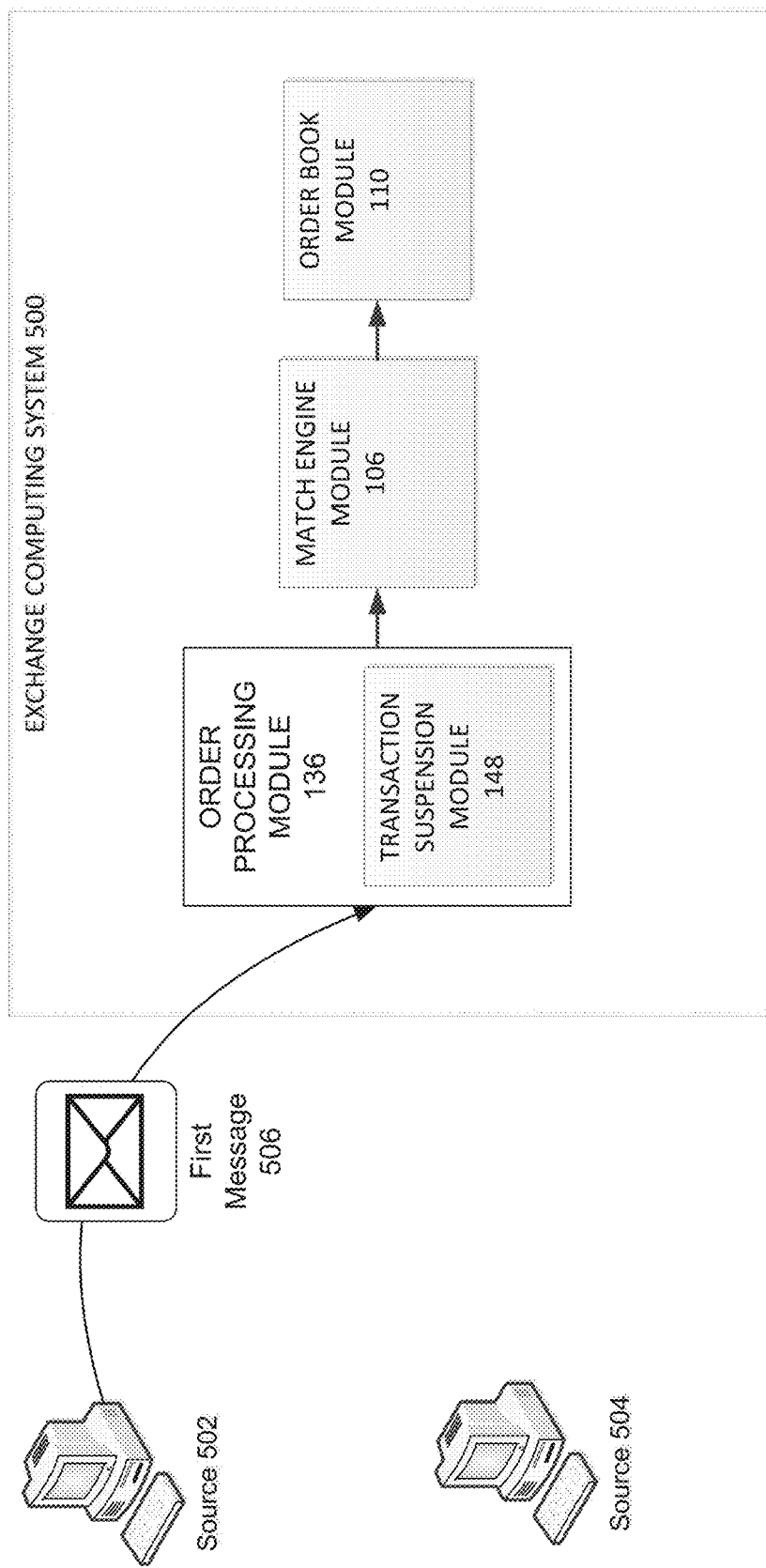
FIGS. 5A to 5J depict block diagrams of an exemplary implementation of a transaction suspension system in accordance with the disclosed embodiments.

The disclosed transaction suspension system may be implemented, in one embodiment, as a transaction suspension module 148, as shown in FIG. 5A, as part of an exchange computing system 500. System 500 may include, or be the same as, or be similar to, system 100 described above, and be configured to receive messages from sources, e.g., sources 502 and 504, over a network. A source 502 may send a first message 506 to exchange computing system 500. Order processing module 136 may receive and process first message 506. The first message 506 may specify performing a financial transaction, e.g., buy or sell, on a product at a value. The product may be a financial instrumented transacted by exchange computing system 500. The transaction suspension module 148 may record information about the first message 506.

Figure 5B:
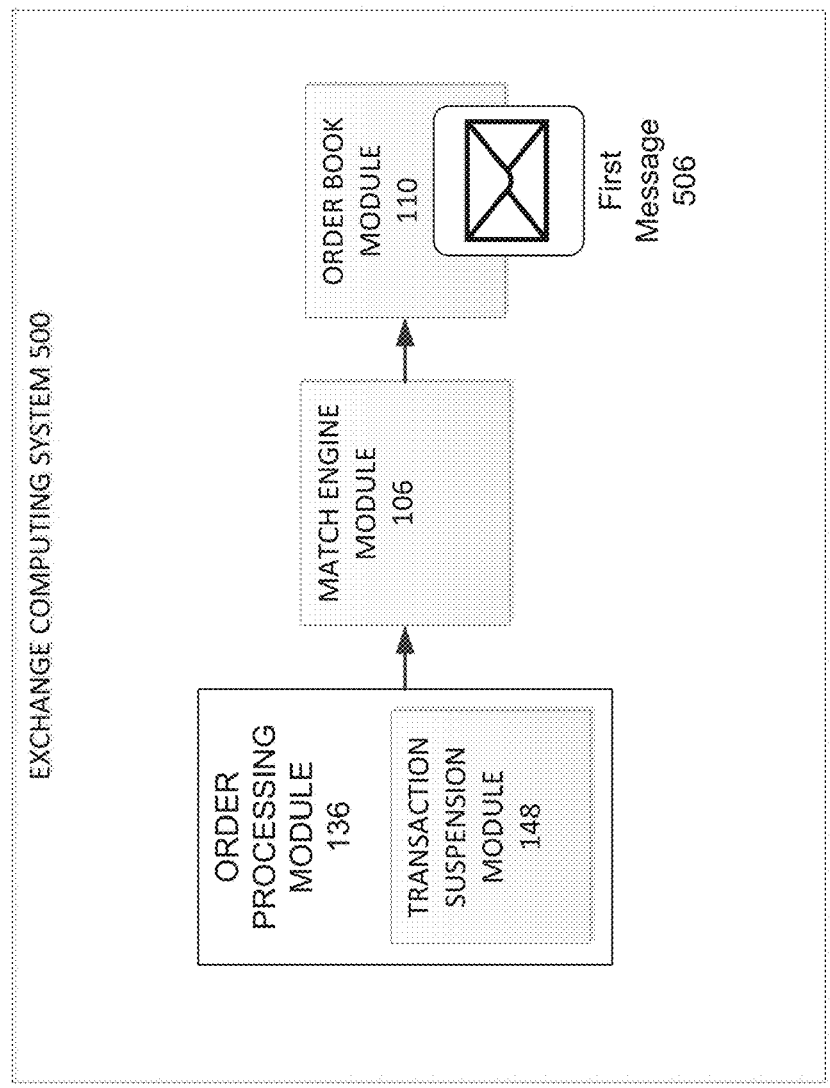
Figure 5B:

The order processing module 136 and/or match engine module may determine that first message 506 does not fully match resting orders and that the contents of first message 506 modify a data object representing an order book associated with the product. As illustrated in FIG. 5B, the first message 506 affects or modifies, as graphically represented as touching or being in contact with, the order book module 110. In other words, processing first message 506 by exchange computing system 500 causes modification of the order book, e.g., the data object representing the order book, associated with the product specified in the first message 506. For example, the data object associated with an order book may be similar to the data object 402 described above. Processing first message 506 may change the quantities or positions stored with queues associated with an order book data object managed by order book module 110.

Notably, an order book modification may be published to all market participants via data feeds described herein. Thus, the processing of first message 506 may be cause an effect on an order book which is then broadcast to all market participants, such as other different traders different from first source 502. For example, other traders may react to the changes caused by first message 502. In a centralized and anonymous transaction processing system such as exchange computing system 500, many actors may react to events once they are published or broadcast by the exchange computing system 500.

Figure 5C:
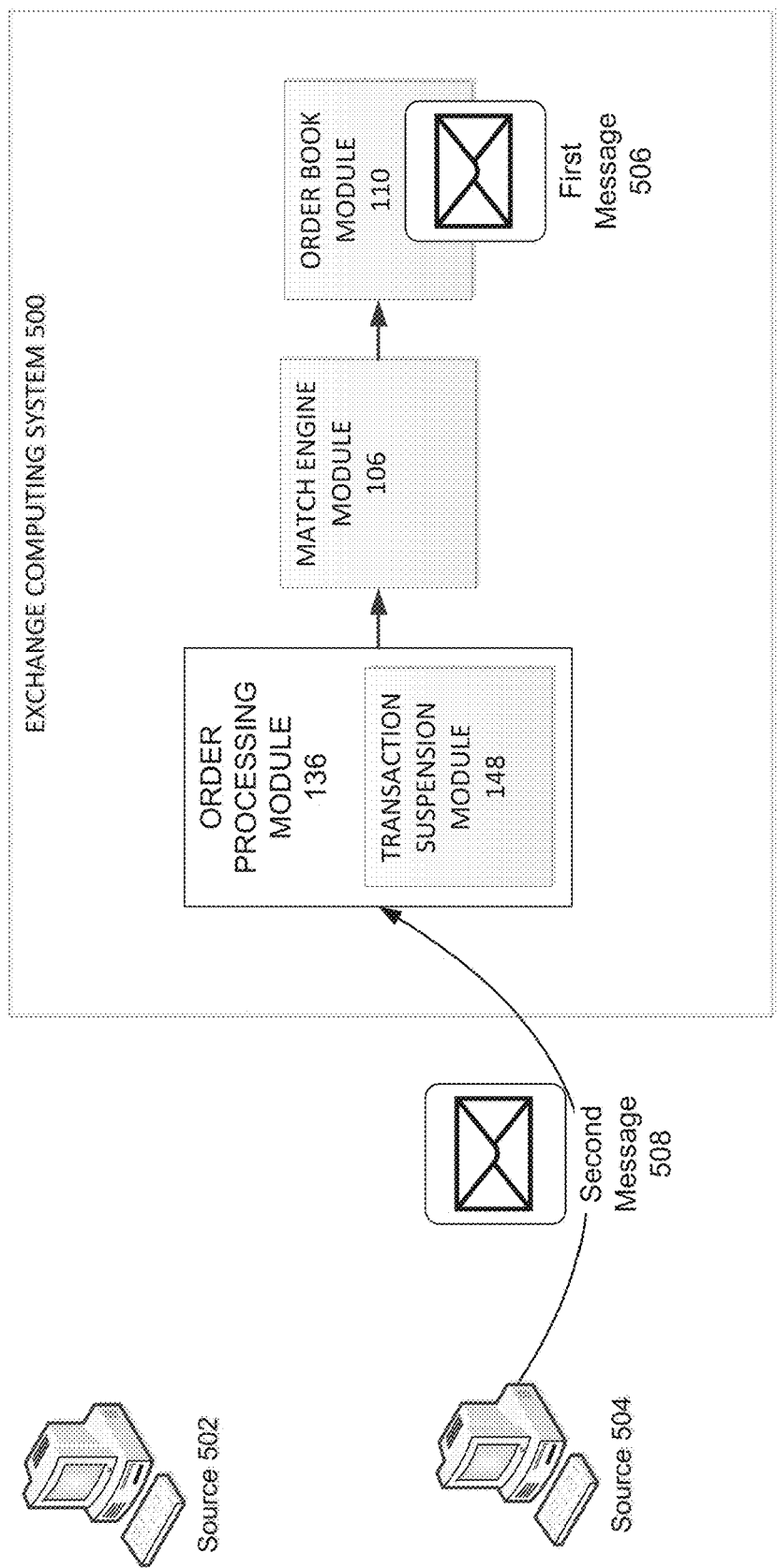

System 500 may subsequently receive second message 508 from a second source 504 different from first source 502, as shown in FIG. 5C. For example, source 502 may be the computer of a first trader, and source 504 may be the computer of a second, different trader.

For example, second source 504 may be programmed to submit second message 508 upon being notified, via a data feed, about the current state of the order book, e.g., including the change to the order book caused by the processing of first message 506.

Figure 5D:
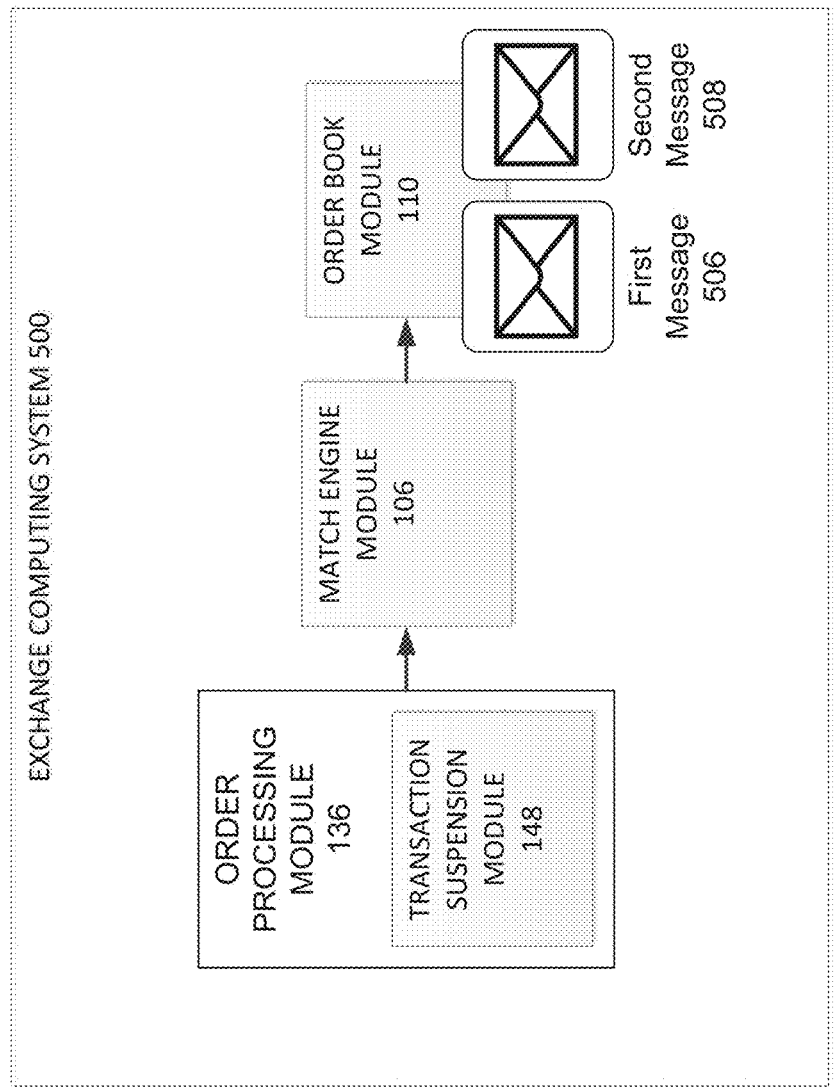
Figure 5E:
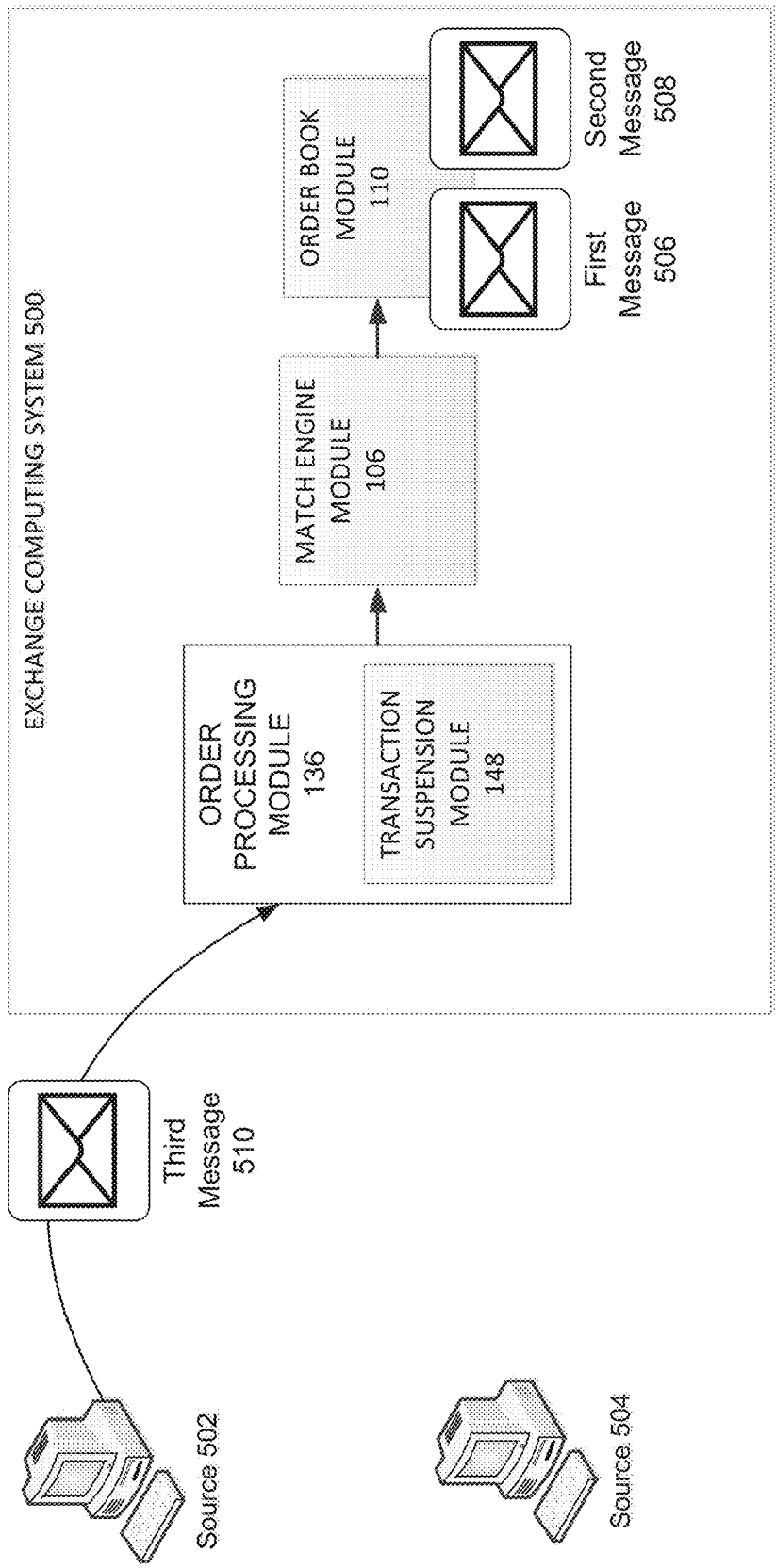

As shown in FIG. 5D, the exchange computing system 500 may process second message 508 and determine that second message 508, like first message 506, also causes modification to a data object representing an order book managed by order book module 110. The transaction suspension module 148 may record information about the second message 508.

System 500 may subsequently receive a third message 510 from the first source 502 at a first time, time $t=t_0$. The third message 510 may include instructions to cancel the first message 506, which was previously submitted by the first source 502. The transaction suspension module 148 may record information about the third message 510.

Figure 5F:
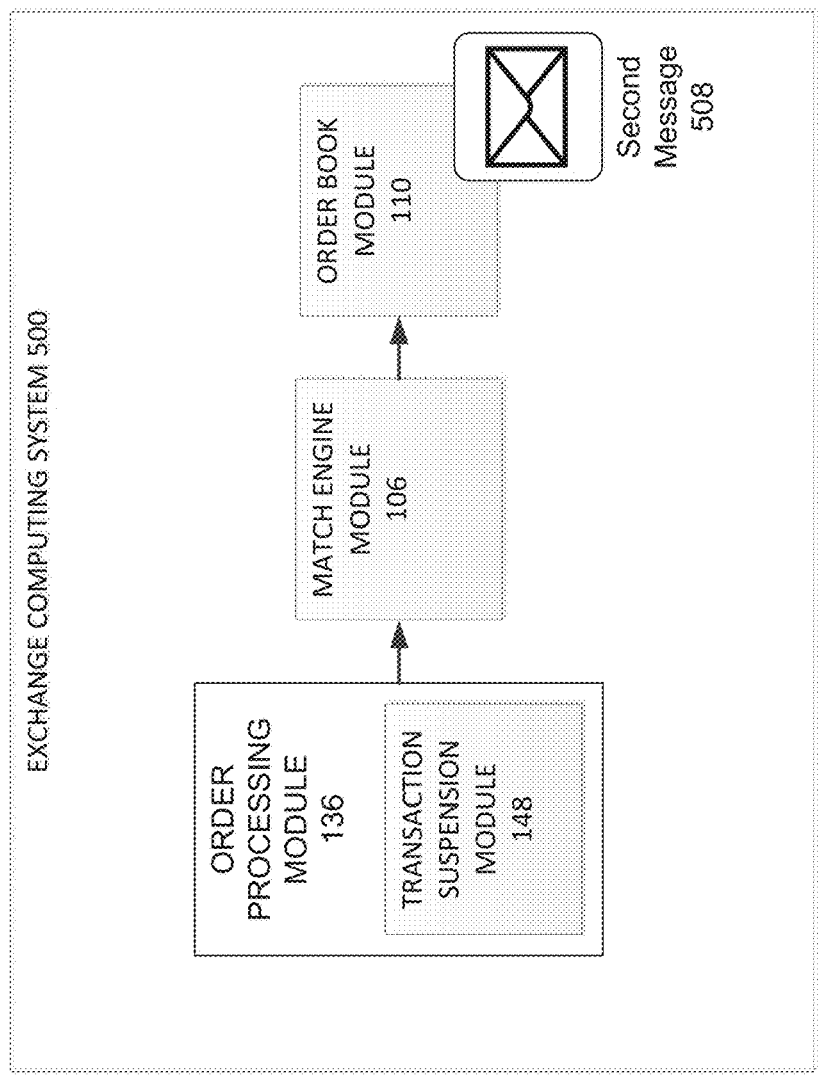

FIG. 5F illustrates the state of exchange computing system 500 upon processing third message 510. In one embodiment, the third message 510 may cancel a resting order previously submitted by first source 502. Thus, the order book may reflect that the effects of first message 506 have been removed from the order book.

Figure 5G:
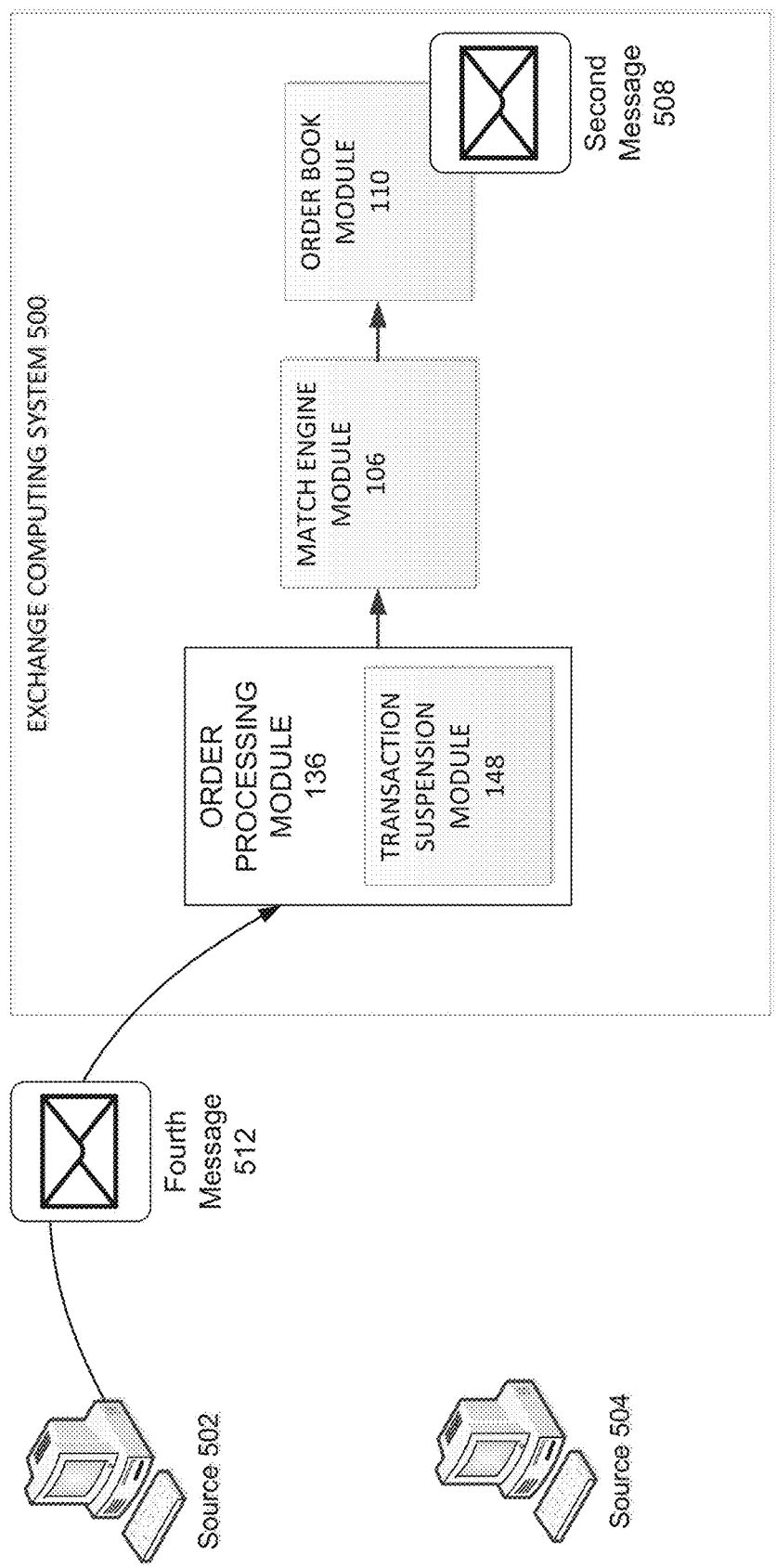
Figure 5H:
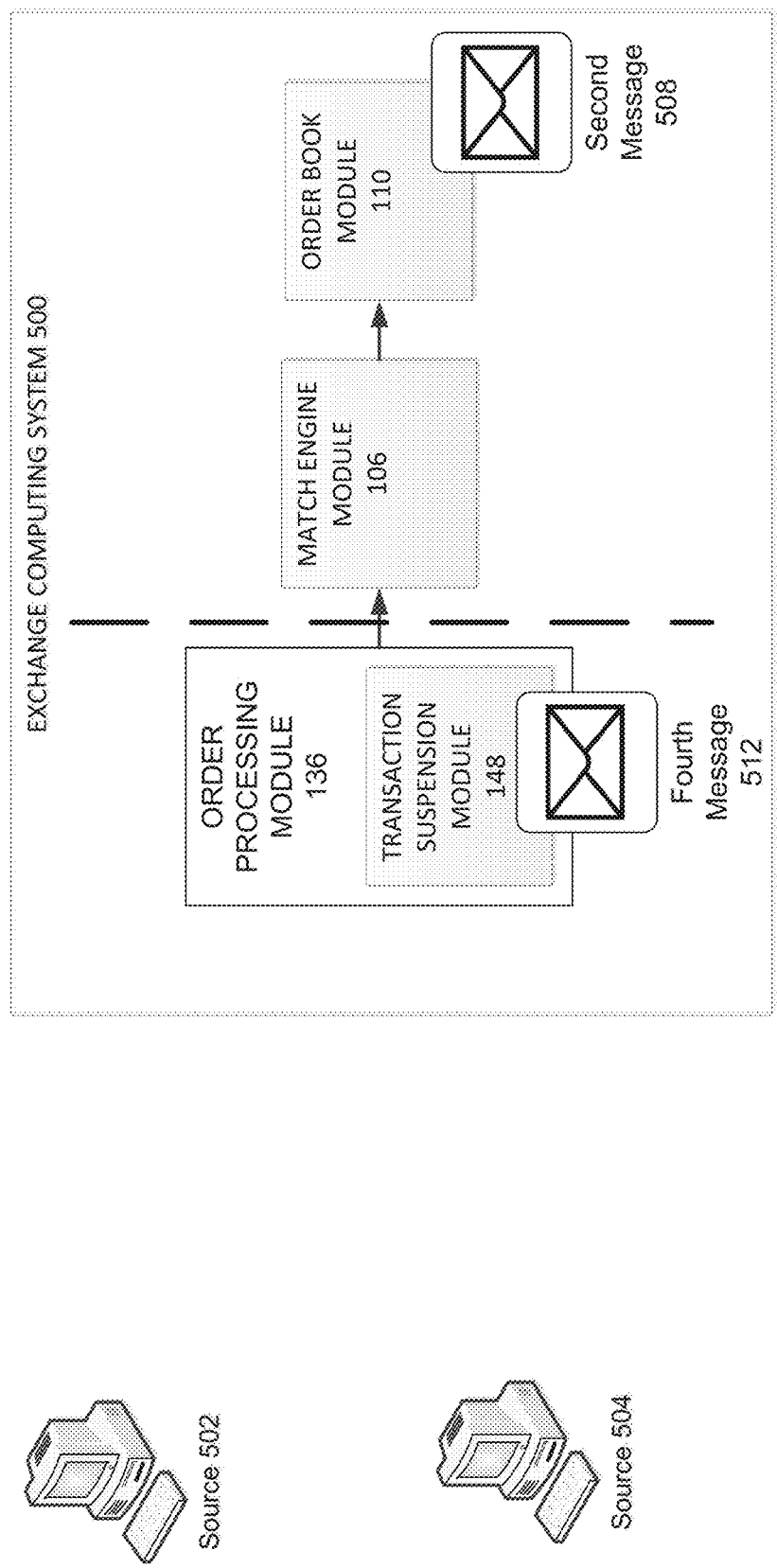

As shown in FIG. 5G, system 500 may subsequently receive a fourth message 512 from the first source 502 at a second time, time $t=t_1$. The fourth message 512 may include instructions that match, or are a counteroffer to, instructions contained within second message 508. For example, the fourth message 512 may be a response to the publishing of a data feed that reflects the instructions contained within second message 508.

The transaction suspension module 148 may record information about the fourth message 512. The transaction suspension module 148 may also record the message pattern of the first, second, third and fourth messages 506, 508, 510 and 512. For example, the transaction suspension module 148 may determine that the first, third and fourth messages 506, 510 and 512 were all submitted by the same first source 502. In one embodiment, the system may be configured to detect if the same person enters multiple different orders, e.g., submits two or more of the same messages described in connection with FIGS. 5A to 5J. Moreover, the transaction suspension module 148 may determine when the third and fourth messages 510 and 512 were received, namely, $t=t_0$ and $t_1$, and how much time elapsed between times $t_0$ and $t_1$.

The transaction suspension module 148 may store one or more message patterns and compare incoming message patterns as messages are received. For example, the transaction suspension module 148 may be configured to build message patterns of a specified number of messages. In one embodiment, the transaction suspension module 148 may build a new message pattern for each newly received message. For example, if transaction suspension module 148 stores a four message pattern, the transaction suspension module 148 may generate a new four message pattern each time a new message is received. If transaction suspension module 148 receives messages A, B, C, and D, transaction suspension module 148 may generate a message pattern from messages A, B, C, and D, and compare the generated message pattern to a stored four message pattern. Upon receiving message E, the transaction suspension module 148 may generate a message pattern from messages B, C, D and E and compare the generated message pattern to a stored four message pattern. Thus, the transaction suspension module 148, in one embodiment, may be continually generating new message patterns as new messages are received by the exchange computing system 100 and transaction suspension module 148. This may be referred to as a rolling window or rolling buffer. If the receipt of a new message causes the generation of a message pattern that corresponds to a stored message pattern, the transaction suspension module 148 may perform an action.

The action may be a corrective action configured to avoid, prevent, or suspend the effects of the detected message pattern. For example, the action may be to stop or pause processing the newly received message, e.g., the last message in the detected message pattern. Or, the action may be to prevent the source of the newly received message, e.g., the last message, from submitting additional messages until a predetermined time elapses. Or, the action may be to prevent the source of the newly received message, e.g., the last message, from submitting additional messages until a predetermined number of other messages from other sources are received.

The exchange computing system may be configured to augment incoming transactions with time signal data, or data indicative of a time of receipt of the transaction. For more detail on tracking the time of receipt of incoming messages in an exchange computing system, see U.S. patent application Ser. No. 15/232,224, filed on Aug. 9, 2016, entitled "Systems and Methods for Coordinating Processing of Instructions Across Multiple Components", the entirety of which is incorporated by reference herein and relied upon.

Referring back to FIG. 5H, if the transaction suspension module 148 determines that the fourth message 512 creates an undesirable pattern, the transaction suspension module 148 may prevent the fourth message 512 from being processed by match engine module 106 and/or order book module 110, as graphically represented as touching or being in contact with the transaction suspension module 148 and separated from match engine module 106 and order book module 110 by the bolded dashed vertical line. For example, the transaction suspension module 148 may detect that the fourth message 512 and second message 508 would match, i.e., one of the messages includes an instruction to one of buy or sell a quantity of a product at a given value, and the other of the messages includes an instruction to the other of buy or sell a quantity of the product at the same given value. In other words, the fourth and second messages may have instructions that are counter to each other (e.g., instructions that match each other) for the same product at the same value (but where the quantity could be different).

In one embodiment, the transaction suspension module 148 may remove the fourth message 512 from the memory, e.g., delete the fourth message 512.

Figure 5I:
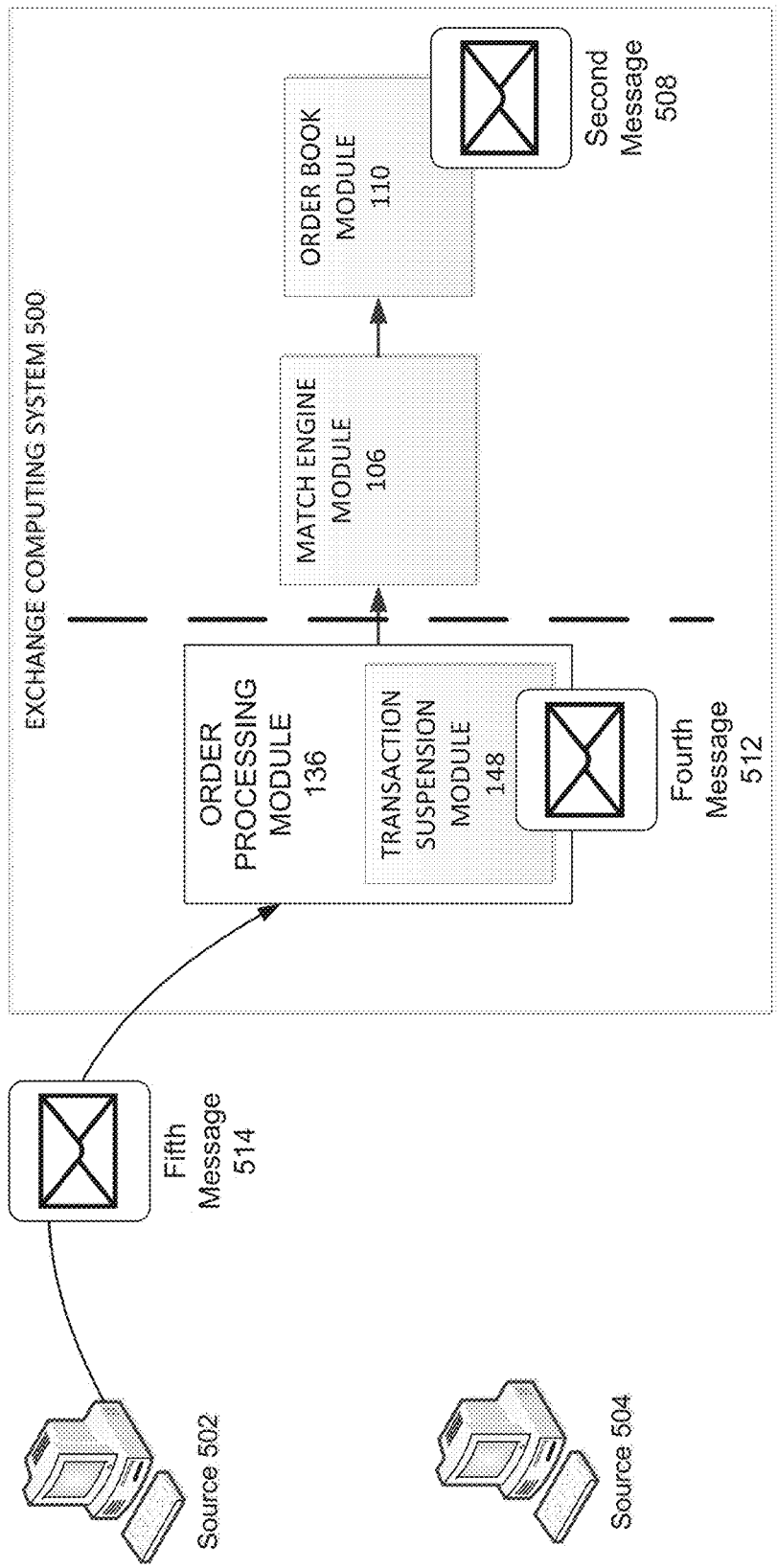
Figure 5J:
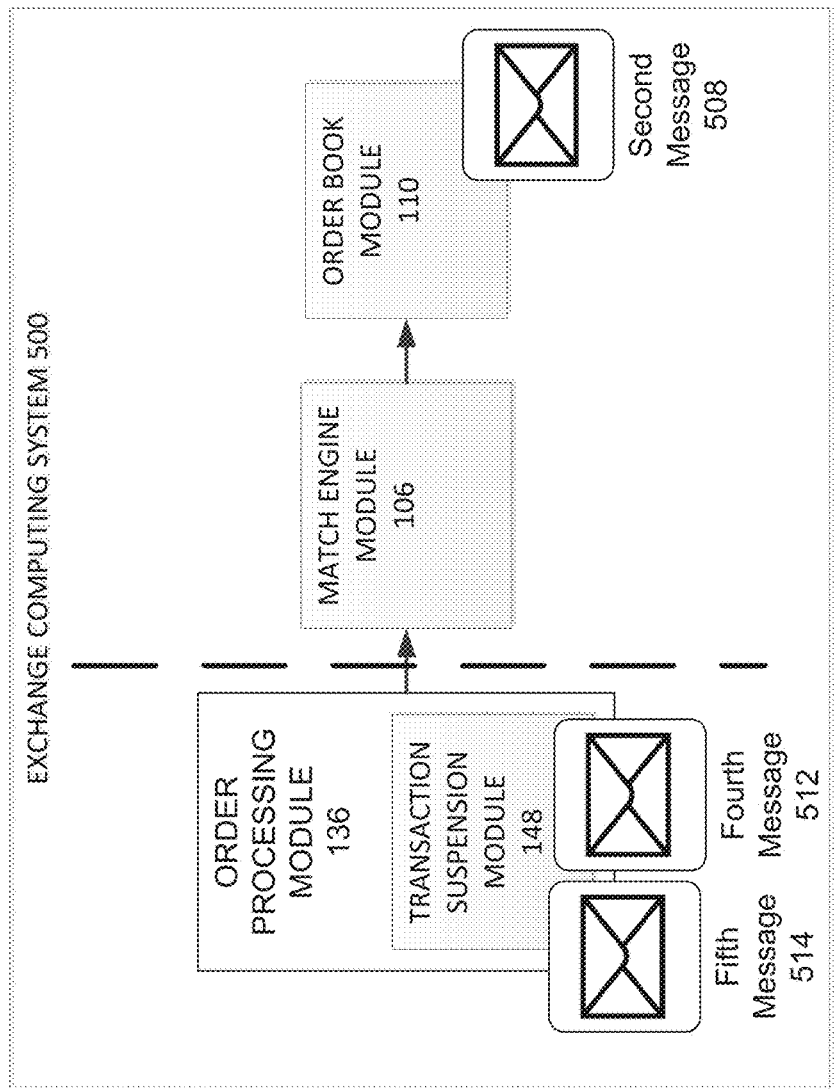

The system may subsequently receive a fifth message 514 from the first source 502, as shown in FIG. 5I. However, the transaction suspension module 148 may prevent the fifth message 514 from being processed by match engine module 106 and/or order book module 110, as shown in FIG. 5J.

Or, the transaction suspension module 148 may only prevent processing of additional messages from the first source 502 that would match with the second message. Thus, if, after the message pattern is detected upon receiving the fourth message 512, the first source 502 submits a fifth message 514 that, like the fourth message 512, would match with the second message 508, then the transaction suspension module 148 may suspend processing of the fifth message 514. If, however, the fifth message 514 does not match with the second message 508, the transaction suspension module 148 may process the fifth message 514 even though the source of the fourth and fifth messages 512 and 514 are the same source.

It should be appreciated that the result of detecting and suspending the disclosed message pattern ending with the fourth message 512 could be treating subsequent messages, e.g., the fifth message 514, in specific ways. For example, unlike the example shown in FIG. 5I, the fifth message 514 may be submitted by the second source 504, and the fifth message 514 may be a request to cancel the second message 508. Or, the fifth message 514 may be transmitted by a third, different source (not shown), and may be a message that matches with the second message 508. In that case, the transaction suspension system may, upon detecting that the source of the fifth message 514 is different from the source of the first and fourth messages 506 and 512, allow the fifth message 514 to match with the second message 508.

Typical exchanges, without the transaction suspension system, would not be able to detect any message pattern and simply be required to manually undo the match event resulting from the processor matching the second and fourth messages. For example, exchanges typically provide for a customer service center, where customers can contact the exchange if customers believe a match was improper. An improper match may be, for example, based on incorrect processing by the exchange, or may be based on perceived manipulative and/or unfair actions by market participants, or outcomes that market participants would agree would be undesirable. Without the transaction suspension system, the exchange would have to determine whether the messages fit an undesirable message pattern, or a message pattern that violates exchange rules or rules promulgated by agencies. For example, exchange or financial technology rules may require an exchange to void matches that are deemed harmful to an overall financial trading community. A transaction suspension system that stores undesirable message patterns, constantly evaluates incoming message streams and is configured to prevent the effects of a message in that message stream, e.g., the last message that completes a message pattern, could proactively solve the problem that arises specifically in the realm of anonymous data transaction processing. The transaction suspension system, in one embodiment, avoids an operator of an exchange computing system having to manually unwind or undo, or reverse the effects of, already processed transactions.

In particular, in a computer network system that receives multiple messages from different sources, it may be that the identity of the sources controls whether or not a message pattern is deemed undesirable or not. For example, in the example given above in connection with FIGS. 5A to 5J, if the same, source 502 did not submit both the third and fourth messages 510 and 512, the transaction suspension system would not identify the message pattern of the first, second, third and fourth messages 506, 508, 510 and 512, received by the exchange computing system in the specified order and from the specified sources as a stored message pattern. In one embodiment, the stored message pattern, against with the transaction suspension system compares incoming streams of messages, may specify message characteristics for the messages in the message pattern. For example, a stored message pattern may specify a sequence of events that must occur, the sources of the messages received, and the values included in the messages.

Yet, in an anonymous transaction processing system, such as an exchange computing system, where only the central counterparty can by definition be aware of the various matching parties, individual parties cannot have access to the other parties' identities. Only an exchange computing system that is a central counterparty to two other parties can determine whether or not a message pattern is undesirable. Thus, an exchange computing system including the disclosed transaction suspension system solves a problem specifically rooted in computer processing, e.g., anonymous transaction processing where the state of an electronic marketplace is published to all market participants. Notably, the central counterparty, e.g., the exchange computing system, in a CCP model is the only entity in a position to determine messaging patterns of particular participants.

The message pattern may include characteristics of the state of the electronic marketplace as well. Thus, the transaction suspension system may only suspend messages if previous messages caused the state of the electronic marketplace, e.g., a data object representing the order book for an object, to be for example, dominated by entries from a single source, which may be configurable. For example, the transaction suspension system may detect that multiple resting order entries are all associated with the same source.

Or, the transaction suspension system may detect that a single unique trader may be associated with 80% of all the buy orders for a given product. Then, if the single unique trader, upon being notified that other traders have joined the buy side for that product, cancels some of its buy orders, and then submits a sell order that attempts to match with, or aggress, others' buy orders, the transaction suspension system may prevent the last order from matching.

The message pattern, and the state of the order book which may trigger the transaction suspension system from acting, may be configurable and implementation dependent. An operator of the exchange computing system may be able to determine specific undesirable scenarios and patterns. For example, the transaction suspension system may evaluate not just incoming messages, but may also or alternatively evaluate the impact of the incoming messages on the order book. In one embodiment, the transaction suspension system may consider whether the quantity associated with an incoming message will all trade, will all rest, or will partially trade and partially rest on the books, as part of the message pattern.

Figure 6A:
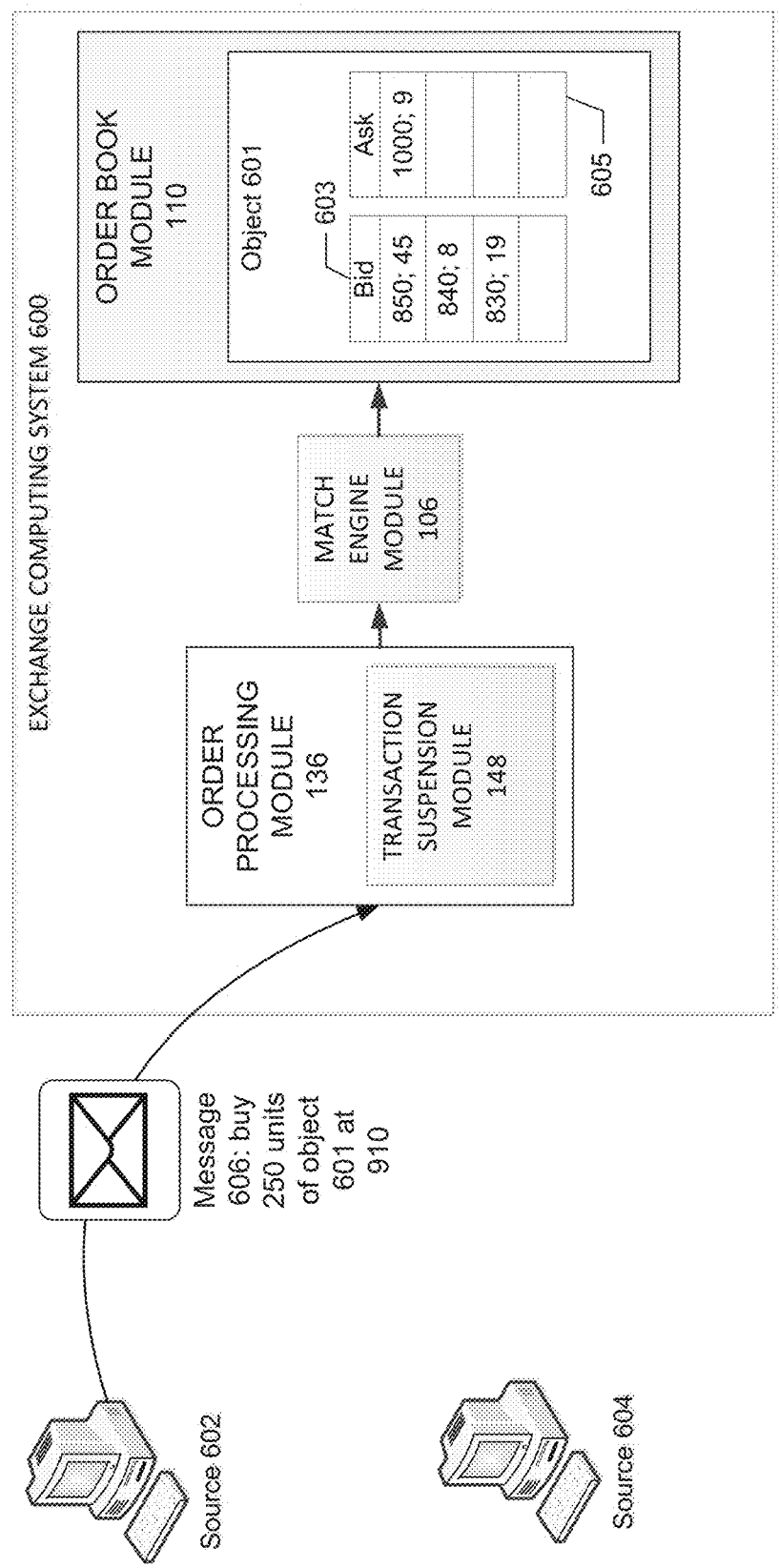
FIGS. 6A to 6G depict block diagrams of an exemplary implementation of a transaction suspension system in accordance with the disclosed embodiments.

FIG. 6A illustrates an example exchange computing system 600. System 600 may include, or be the same as, or be similar to, system 100 described above, and be configured to receive messages from sources, e.g., sources 602 and 604, over a network. The object book module 110 may read/write data from/to an object 601 representing the electronic marketplace for a product traded on the exchange computing system 600. As shown in FIG. 6A, object 601 includes two queues 603 and 605 representing the outstanding or resting bid and ask orders for the financial instrument associated with object 601.

Bid queue 603 includes an order to buy 45 units (e.g., the quantity) of the financial instrument associated with object 601 at price or value 850; an order to buy 8 units of the financial instrument associated with object 601 at value 840; and an order to buy 19 units of the financial instrument associated with object 601 at value 830. Ask queue 605 includes an order to sell 9 units of the financial instrument associated with object 601 at value 1000. Notably, because the best bid does not match the best ask, the orders did not match and are therefore outstanding or resting orders within the order book for the financial instrument associated with object 601. As shown in FIG. 6A, source 602 may transmit a message 606 including an instruction or order to buy 250 units of the financial instrument associated with object 601 at value 910 to the exchange computing system 600.

Figure 6B:
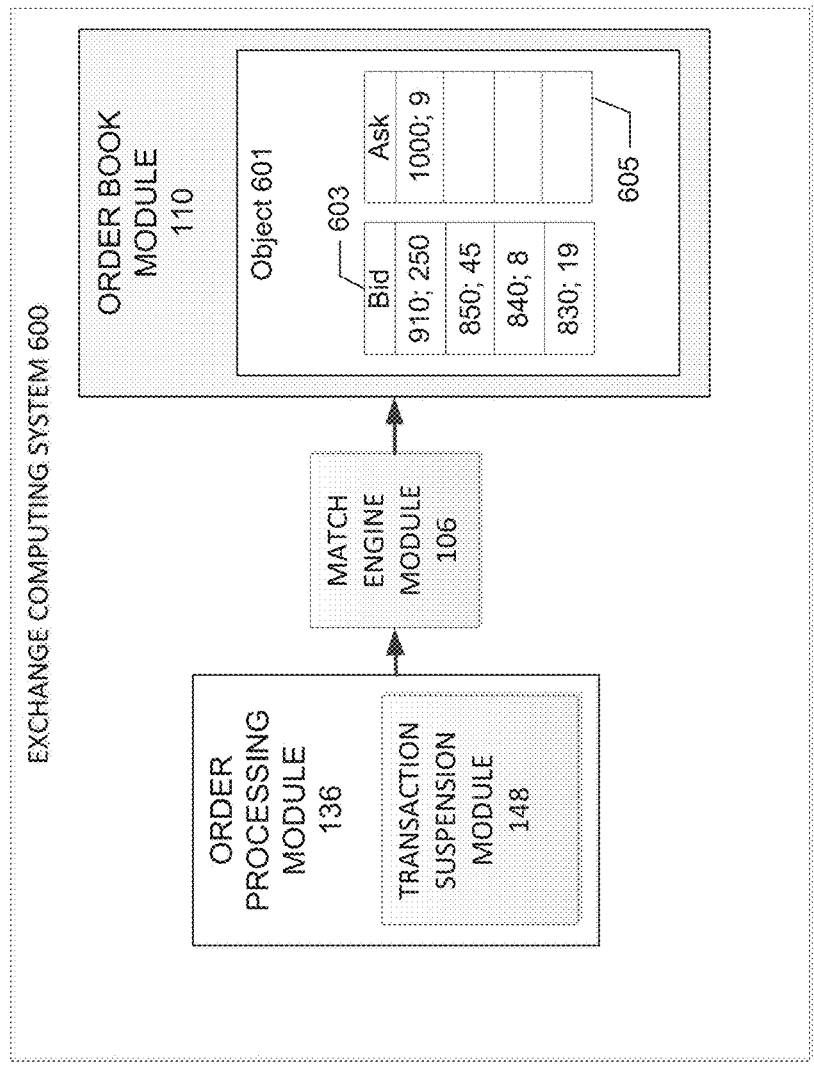
Figure 6B:
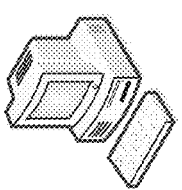
Figure 6B:
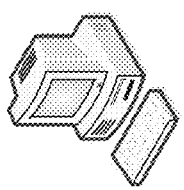

Message 606, which was a message to buy the financial instrument associated with object 601, does not match with any of the orders in the Ask queue 605, namely the order at value 1000, because the values 1000 and 910 do not match. Processing message 606 does however cause a modification to the order book, e.g., object 601. In particular, as shown in FIG. 6B, the bid queue 603 now includes the order to buy 250 units of the financial instrument associated with object 601 at value 910. Because value 910 is the best (highest) bid, that order is illustrated as the first or topmost order in the bid queue 603. The transaction suspension system may record and keep track of the impact of message 606 to determine whether messages correspond to a stored message pattern.

For example, the transaction suspension system may be configured to detect a message pattern, or compare incoming streams of messages with a store message pattern, where the first message of the message pattern requires that an incoming message cause one source to account of or be associated with over 50% of the resting or outstanding quantity associated with any one transaction. In the example of FIG. 6B, source 602 (the transmitter of message 606) is associated with 250 resting units in the bid queue 603, where the total resting unit quantity for bid queue 603 is 322 (250+45+8+19). Source 602 is accordingly responsible for or accounts for 77.6% (250/322) of the total resting buy quantity.

Figure 6C:
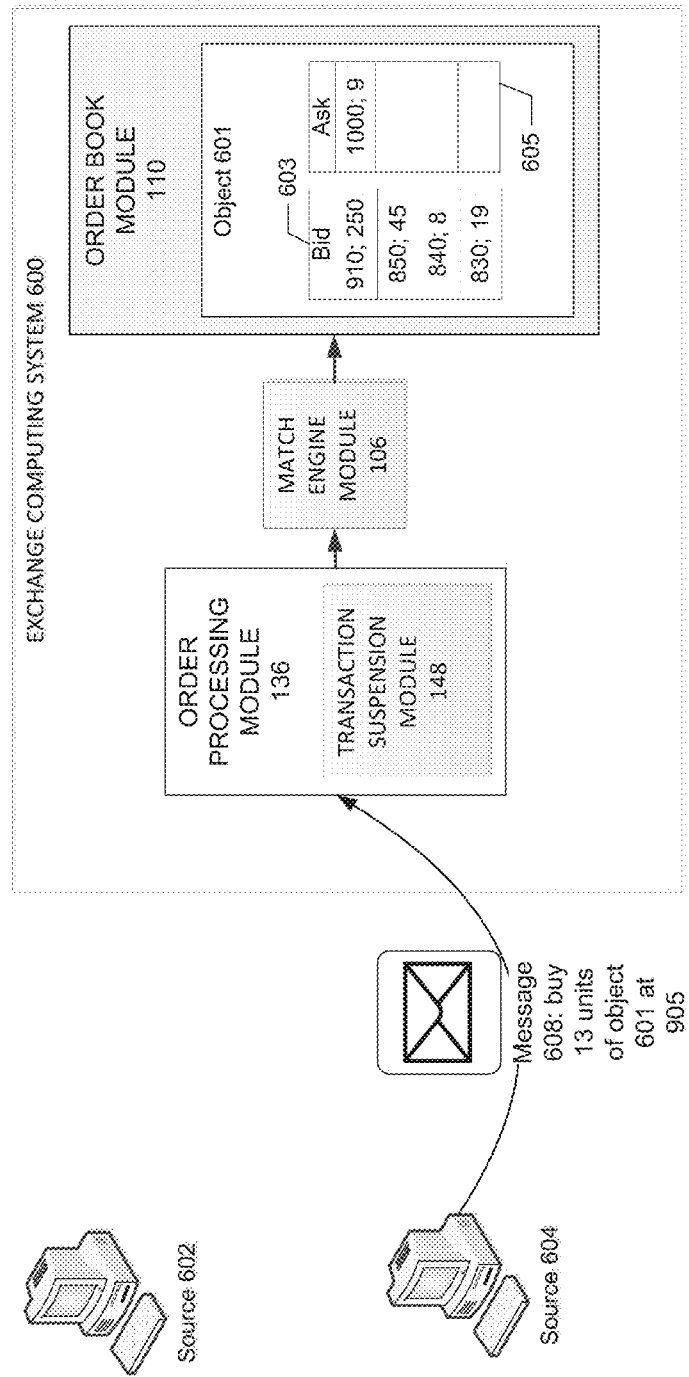

As discussed herein, the exchange computing system publishes a market data feed containing information about the state of the order books for various financial instruments electronically traded on the exchange computing system, including information about object 601 associated with a financial instrument. Source 604 may receive the state of the order book, including the relatively large order for buying the financial instrument associated with object 601 at 910, and may transmit a message to exchange computing system. In particular, as shown in FIG. 6C, source 604 may transmit message 608 including an instruction or order to buy 13 units of the financial instrument associated with object 601 at value 905 to the exchange computing system 600.

Figure 6D:
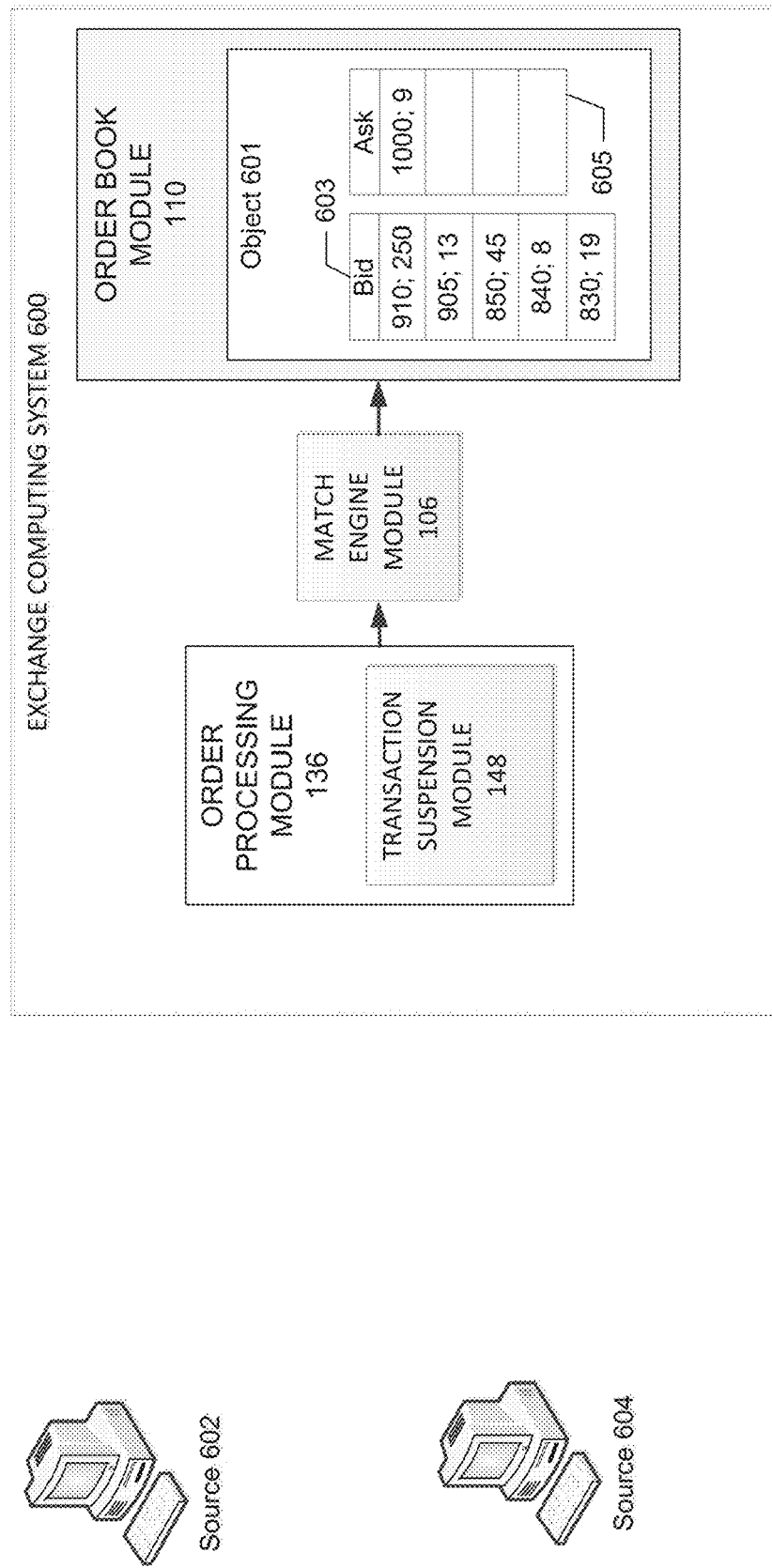

Message 608, which was a message to buy the financial instrument associated with object 601, does not match with any of the orders in the Ask queue 605, namely the order at value 1000, because the values 1000 and 905 do not match. Processing message 608 does however cause a modification to the order book, e.g., object 601. In particular, as shown in FIG. 6D, the bid queue 603 now includes the order to buy 13 units of the financial instrument associated with object 601 at value 905. Because value 910 is still the best (highest) bid, that order is illustrated as the first or topmost order in the bid queue 603, followed by the newly submitted value 905. The transaction suspension system may record and keep track of the impact of message 608 to determine whether the incoming combination of messages correspond to a stored message pattern.

Figure 6E:
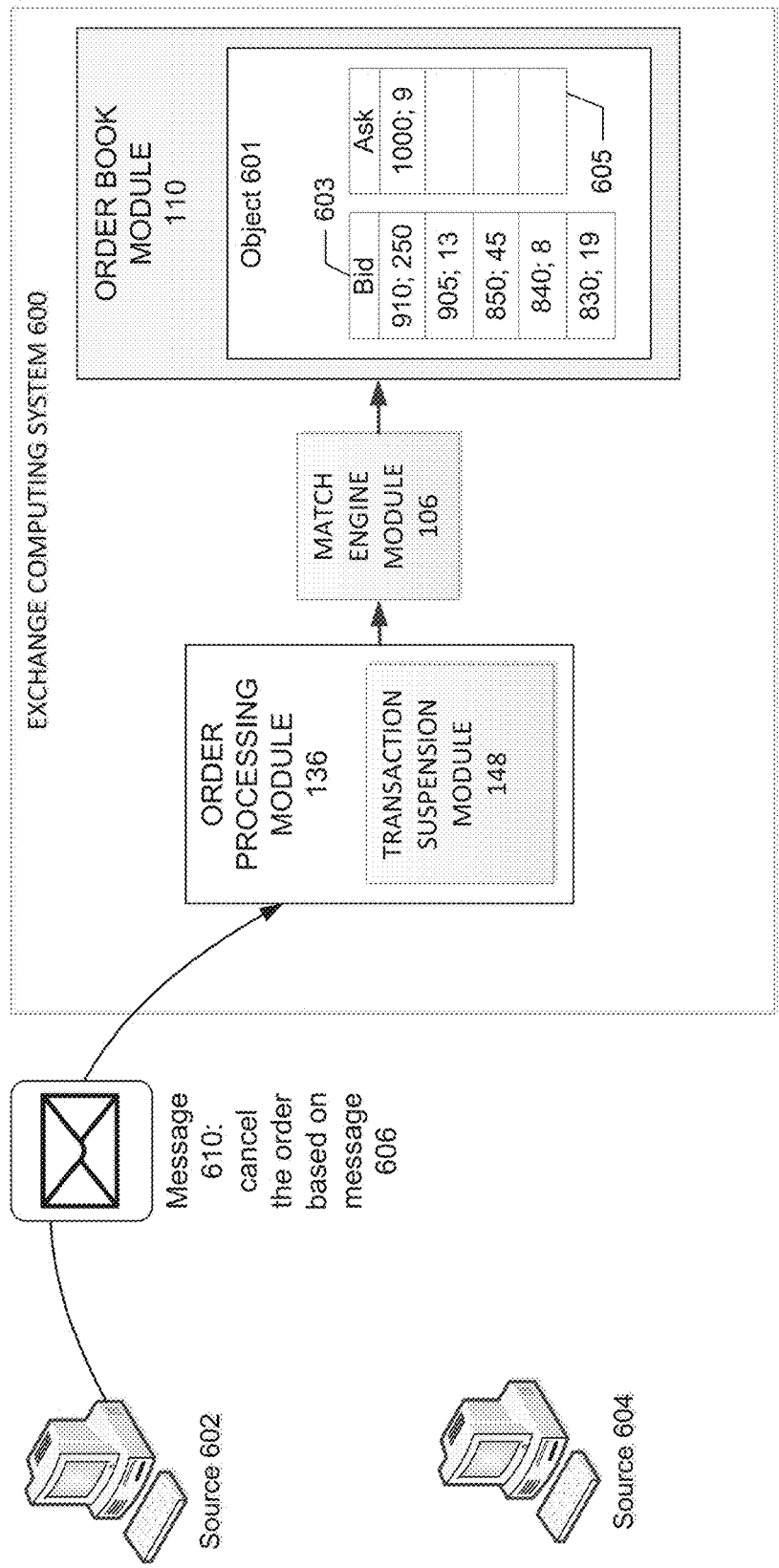
Figure 6F:
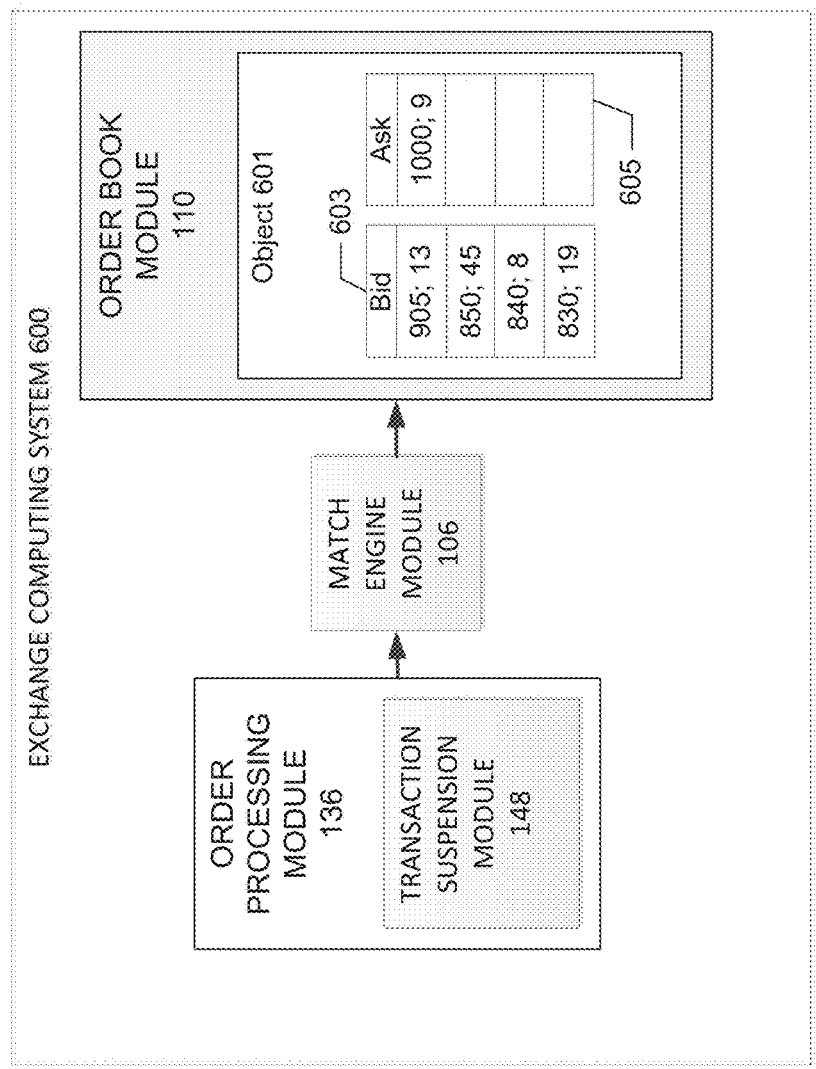
Figure 6F:
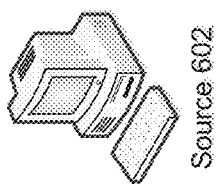
Figure 6F:
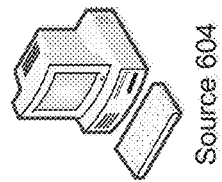

If the exchange computing system 600 subsequently receives message 610 from source 602 canceling message 606 (which is possible because source 602 also transmitted message 606, as known to the exchange computing system) at time 2:54:03.0050 pm (i.e., 50 milliseconds after 3 seconds after 2:54 pm), as shown in FIG. 6E, the order book module 110 will remove the value and quantity associated with message 606 from bid queue 603, as shown in FIG. 6F. FIG. 6F depicts that the order to buy 250 units of the financial instrument associated with object 601 at value 910 has been removed from object 601. Notably, because value 905 is now the best (highest) bid, the 905 order is illustrated as the first or topmost order in the bid queue 603 in FIG. 6F.

Figure 6G:
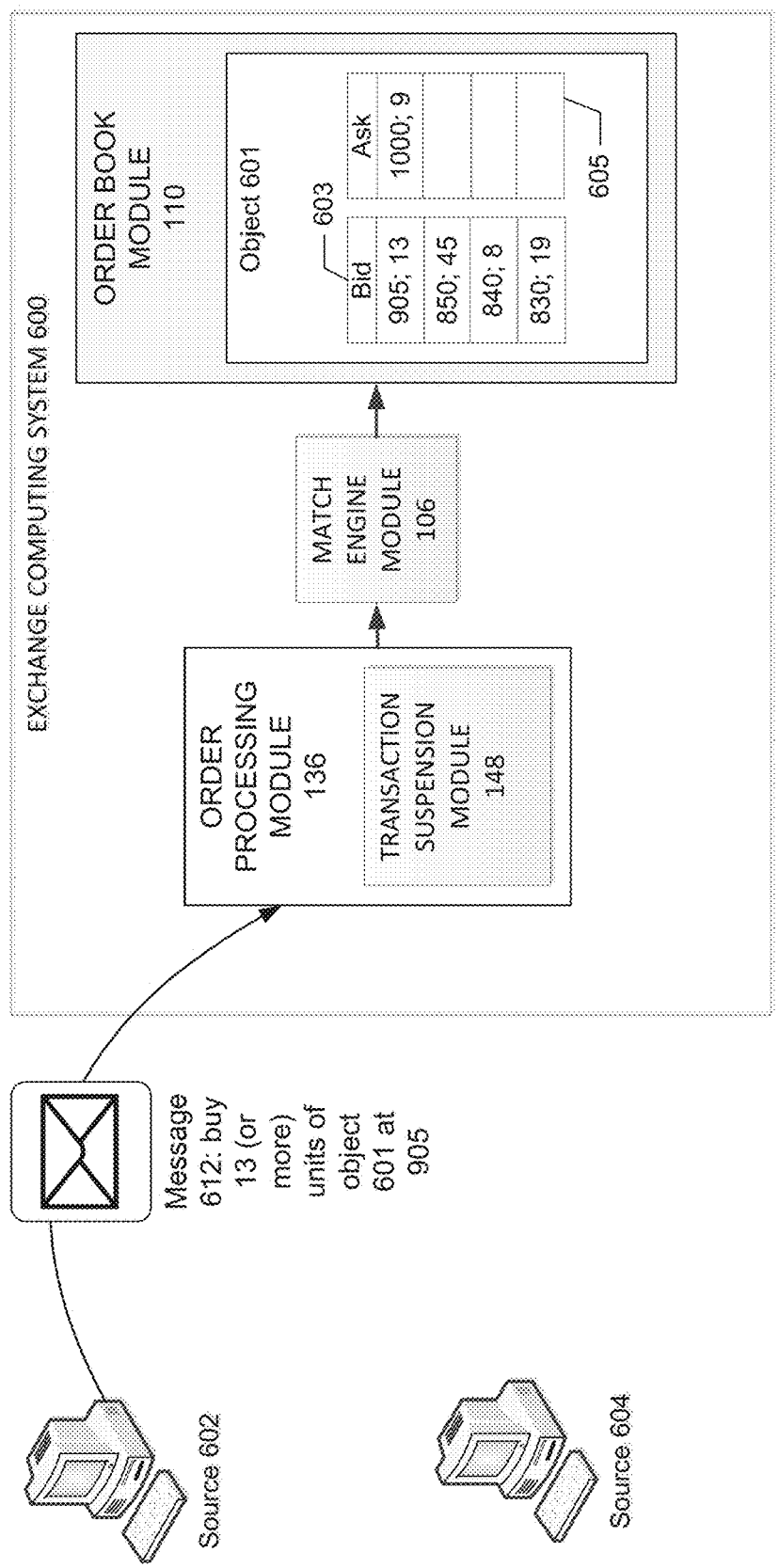

The transaction suspension system may further detect and record if exchange computing system receives, from source 602, message 612 including an instruction to buy 13 (or more) units of the financial instrument associated with object 601 at value 905, as shown in FIG. 6G. The transaction suspension system may also detect that message 612 was received at 2:54:03.0055 pm, or within 5 milliseconds of receiving message 610 (also from source 602). Transaction suspension system may accordingly recognize that the messages 606, 608, 610 and 612, and their characteristics (such as their respective sources, and their effects on the order book object for a financial instrument) comprise a stored, undesirable message pattern. Even through traditional matching systems would have matched the buy order in message 612, with the 13 units at value 905 in the bid queue 601, the transaction suspension system prevents, suspends, delays, deletes or blocks the buy order in message 612 from matching with the 13 units at value 905 in the bid queue 601. Instead, the transaction suspension system may delete or temporarily prevent processing of message 612, or any other aggressing messages from source 602.

The transaction suspension system may process other messages, such as cancel requests from source 604, or other non-aggressing (e.g., non-matching) messages from source 602, or any messages from source 602 for some other financial instrument not associated with the order book represented by object 601.

The transaction suspension system is highly configurable, and may allow the operator to specify:

How a unique source/entity/trading firm is determined;

The percentage of the total number of orders one side that a unique entity or source can represent (or be associated with) and subsequently cancel without triggering the disclosed transaction suspension system;

The percentage of the total number of volume or quantity on one side that a unique entity or source can represent (or be associated with) and subsequently cancel without triggering the disclosed transaction suspension system; or How much time must a unique entity that cancels large orders on one side wait before it can place aggressing orders on the other side.

The operator may configure the transaction suspension system differently for each product. Thus, the transaction suspension system can detect undesirable scenarios, which may be specific to each financial instrument or asset class, across a range of products.

In one embodiment, the transaction suspension system may only prevent a unique entity from matching with orders added to the order book after the entity represented a large percentage of one side of the book.

In one embodiment, the transaction suspension system may detect a message pattern where the first message of the message pattern results in any one entity being associated with a preconfigured percentage of the total available quantity at a value (e.g., price) level.

In one embodiment, the system may detect when any one entity owns or becomes associated with, due to an incoming message, a preconfigured percentage of the total available quantity at multiple, continuous value (e.g., price) levels.

In one embodiment, the transaction suspension system may simply search for incoming message patterns irrespective of or without regard to the source of the messages.

The transaction suspension system may continuously evaluate incoming messages, and may evaluate groups of incoming messages based on the stored message patterns. For example, if the transaction suspension system stores a five-message pattern, the transaction suspension system evaluates incoming messages, in continuous groups of five messages. The transaction suspension system may evaluate the messages in a five message buffer, or in a continuous rolling window of five messages, where the newest message is added to the buffer or window, and the oldest message is removed from the buffer or window.

In one embodiment, each time a message is received, the message, or data about the message, is stored in an entry in a buffer. Further, with the receipt of each message, the contents of the buffer are compared to one or more stored message patterns. If the contents of the buffer correspond to one of the patterns, matching is suspended, etc. The buffer may only have a limited number of slots (e.g., window/rolling window) so that when the buffer is full, the oldest entries get removed.

The message patterns may be based on any combination of data, orders, sources, etc. The patterns may be statically defined or dynamic. Thus, the message patterns may be stored in memory and do not change. Or, the message pattern to detect may be based on for example, the current state of the order book or some other dynamic variable. In this case the patterns may dynamically change over time or as transactions are received.

Thus, the transaction suspension system may evaluate the state of a message pattern buffer as new messages are received by the transaction suspension system. As messages are received, the buffer state is updated, and older messages are discarded from the transaction suspension system message pattern buffer. Upon detecting a stored or predetermined message pattern, the transaction suspension system prevents or suspends matching. The collection of messages in a buffer may be compared with the stored message patterns by using a content-addressable memory.

In one embodiment, the system may maintain multiple rolling windows/buffers where, as messages come in, their data may be routed to one of the multiple buffers, i.e. to evaluate incoming messages against multiple stored message patterns in parallel, message patterns embedded in/intermixed/interleaved/overlapping with other message patterns, etc. For example, one message pattern buffer may only include messages from a particular source. Any additional messages from that source are routed to that buffer.

It should be appreciated that the transaction suspension system may prevent matching orders that may have otherwise matched, thus reducing the overall processing performed by the match engine. The system will also likely reduce market participants from placing large orders that they do not intend to execute, e.g., large orders placed just to entice other market participants from joining the market, thereby reducing messaging.

Figure 7:
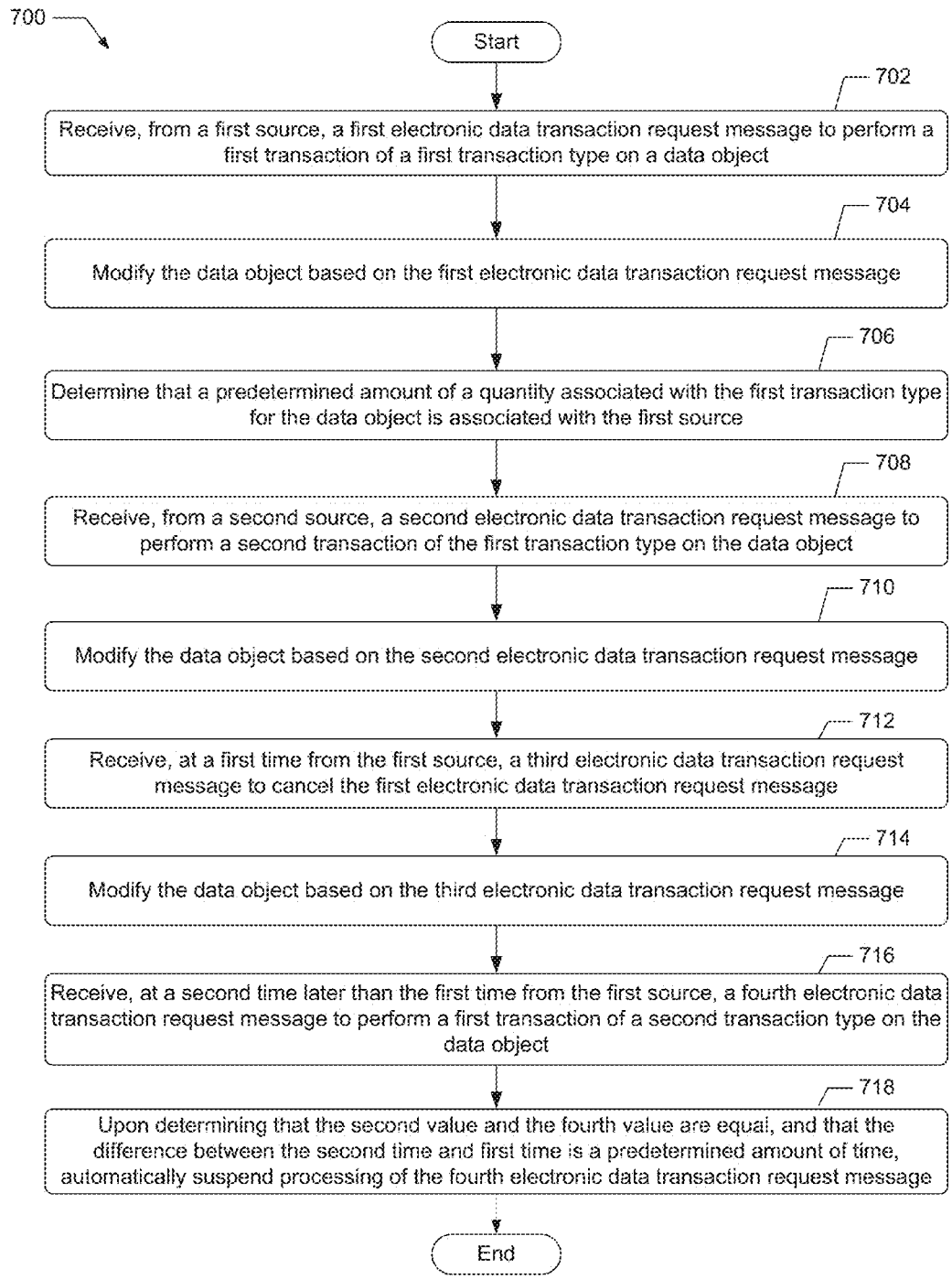
FIG. 7 depicts an example flowchart for implementing a transaction suspension system in accordance with the disclosed embodiments.

FIG. 7 illustrates an illustrates an example flowchart 700 indicating an example method of implementing a transaction suspension system, as may be implemented with computer devices and computer networks, such as those described with respect to FIGS. 1 and 2. Embodiments may involve all, more or fewer actions indicated by the blocks of FIG. 7. The actions may be performed in the order or sequence shown or in a different sequence. In one embodiment, the steps of FIG. 7 may be carried out by transaction suspension module 148.

The method or operation of the transaction suspension system includes receiving, from a first source, a first electronic data transaction request message to perform a first transaction of a first transaction type on a data object, the first electronic data transaction request message having a first value and a first quantity (block 702). The operation further includes modifying the data object based on the first electronic data transaction request message (block 704).

The process also includes determining that a predetermined amount of a quantity associated with the first transaction type for the data object is associated with the first source (block 706). For example, the transaction suspension system may determine that the first source, due to the processing of the first electronic data transaction request message, is associated with more than 50% of the pending or outstanding orders for a financial instrument associated with the data object. For another financial instrument, the threshold amount that the transaction suspension system detects may be 75%. It should be appreciated that this percentage may be user configurable and implementation and product dependent.

The process further includes receiving, from a second source, a second electronic data transaction request message to perform a second transaction of the first transaction type on the data object, the second electronic data transaction request message having a second value and a second quantity (block 708). The process further includes modifying the data object based on the second electronic data transaction request message (block 710).

The process further includes receiving, by the processor at a first time from the first source, a third electronic data transaction request message to cancel the first electronic data transaction request message (block 712). The process further includes modifying the data object based on the third electronic data transaction request message (block 714).

The process further includes receiving, at a second time later than the first time from the first source, a fourth electronic data transaction request message to perform a first transaction of a second transaction type on the data object, the fourth electronic data transaction request message having a fourth value and a fourth quantity (block 716).

The process further includes, upon determining that the second value and the fourth value are equal, and that the difference between the second time and first time is a predetermined amount of time, automatically suspending processing of the fourth electronic data transaction request message (block 718).

Figure 8:
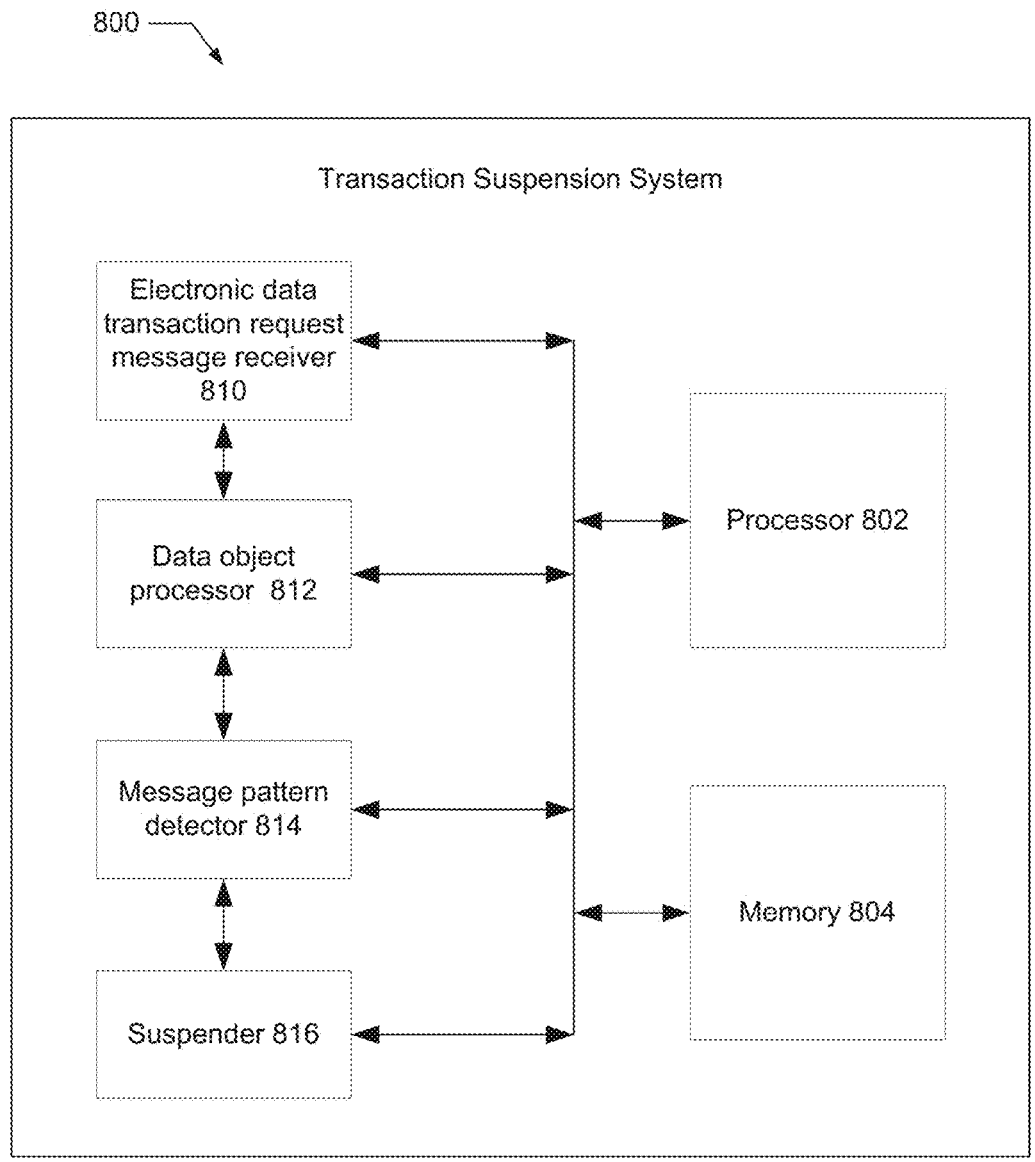
FIG. 8 depicts a block diagram of an exemplary implementation of a transaction suspension system in accordance with the disclosed embodiments.

FIG. 8 depicts a block diagram of a system 800 for suspending orders or messages for a product, such as a financial instrument, which in an exemplary implementation, is implemented as part of the transaction suspension module 148 of the exchange computer system 100.

In one embodiment, the system 800 is coupled with one or more of the order processing module 136, the order book module 110, or the message management module 140 described above and evaluates incoming messages, and monitors the relevant parameters of the order book maintained for the product. It will be appreciated that the system 800 may be coupled to other modules of the exchange computer system 100 so as to have access to the relevant parameters as described herein and initiate the requisite actions as further described. The disclosed embodiments may be implemented separately for each market/order book to be monitored, such as a separate process or thread, or may be implemented as a single system for all markets/order books to be monitored thereby.

The system 800 includes a processor 802 and a memory 804 coupled therewith which may be implemented as a processor 202 and memory 204 as described with respect to FIG. 2.

The system 800 further includes an electronic data transaction request message receiver 810 stored in the memory 804 and executable by the processor 802 to cause the processor 802 to receive and/or analyze electronic data transaction request messages submitted, for example, by users of an exchange computing system implementing the disclosed transaction suspension system. For example, the electronic data transaction request message receiver 810 may receive: a first electronic data transaction request message from a first source to perform a first transaction of a first transaction type on a data object, the first electronic data transaction request message having a first value and a first quantity; a second electronic data transaction request message from a second source to perform a second transaction of the first transaction type on the data object, the second electronic data transaction request message having a second value and a second quantity; a third electronic data transaction request message from the first source at a first time to cancel the first electronic data transaction request message; and a fourth electronic data transaction request message from the first source at a second time later than the first time to perform a first transaction of a second transaction type on the data object, the fourth electronic data transaction request message having a fourth value and a fourth quantity.

The system 800 further includes a data object processor 812 stored in the memory 804 and executable by the processor 802 to cause the processor 802 to modify a data object, which may represent the electronic marketplace or order book for a financial instrument. For example, the data object processor 812 may modify the data object based on: the first electronic data transaction request message; the second electronic data transaction request message; and the third electronic data transaction request message, but not from the fourth electronic data transaction request message because of a message pattern detected by the message pattern detector 814, discussed below.

The system 800 further includes a message pattern detector 814 stored in the memory 804 and executable by the processor 802 to cause the processor 802 to compare incoming streams of messages with stored message patterns. For example, the message pattern detector 814 may, in part, detect: that a predetermined amount of a quantity associated with the first transaction type for the data object is associated with the first source, that the second value and the fourth value are equal, and; that the difference between the second time and first time is a predetermined amount of time. This information, along with other message and order book state characteristics, may be used by the message pattern detector 814 to determine whether incoming streams of messages correspond to stored message patterns.

The system 800 further includes a suspender 816 stored in the memory 804 and executable by the processor 802 to cause the processor 802 to automatically suspend processing of the fourth electronic data transaction request message upon the message pattern detector detecting that a predetermined amount of a quantity associated with the first transaction type for the data object is associated with the first source, that the second value and the fourth value are equal, and that the difference between the second time and first time is a predetermined amount of time.

Referring back to FIG. 1A, the trading network environment shown in FIG. 1A includes exemplary computer devices 114, 116, 118, 120 and 122 which depict different exemplary methods or media by which a computer device may be coupled with the exchange computer system 100 or by which a user may communicate, e.g., send and receive, trade or other information therewith. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail with respect to FIG. 2, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 114 is shown directly connected to exchange computer system 100, such as via a T1 line, a common local area network (LAN) or other wired and/or wireless medium for connecting computer devices, such as the network 220 shown in FIG. 2. The exemplary computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the exemplary computer device 114 or a user thereof. The user of the exemplary computer device 114, or the exemplary computer device 114 alone and/or autonomously, may then transmit the trade or other information to the exchange computer system 100.

Exemplary computer devices 116 and 118 are coupled with a local area network ("LAN") 124 which may be configured in one or more of the well-known LAN topologies, e.g., star, daisy chain, etc., and may use a variety of different protocols, such as Ethernet, TCP/IP, etc. The exemplary computer devices 116 and 118 may communicate with each other and with other computer and other devices which are coupled with the LAN 124. Computer and other devices may be coupled with the LAN 124 via twisted pair wires, coaxial cable, fiber optics or other wired or wireless media. As shown in FIG. 1A, an exemplary wireless personal digital assistant device ("PDA") 122, such as a mobile telephone, tablet based compute device, or other wireless device, may communicate with the LAN 124 and/or the Internet 126 via radio waves, such as via WiFi, Bluetooth and/or a cellular telephone based data communications protocol. PDA 122 may also communicate with exchange computer system 100 via a conventional wireless hub 128.

FIG. 1A also shows the LAN 124 coupled with a wide area network ("WAN") 126 which may be comprised of one or more public or private wired or wireless networks. In one embodiment, the WAN 126 includes the Internet 126. The LAN 124 may include a router to connect LAN 124 to the Internet 126. Exemplary computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 220 shown in FIG. 2.

Users of the exchange computer system 100 may include one or more market makers 130 which may maintain a market by providing constant bid and offer prices for a derivative or security to the exchange computer system 100, such as via one of the exemplary computer devices depicted. The exchange computer system 100 may also exchange information with other match or trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1A may be controlled by computer-executable instructions stored on a non-transitory computer-readable medium. For example, the exemplary computer device 116 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 118 may include computer-executable instructions for receiving market data from exchange computer system 100 and displaying that information to a user.

Numerous additional servers, computers, handheld devices, personal digital assistants, telephones and other devices may also be connected to exchange computer system 100. Moreover, one skilled in the art will appreciate that the topology shown in FIG. 1A is merely an example and that the components shown in FIG. 1A may include other components not shown and be connected by numerous alternative topologies.

Referring back to FIG. 2, an illustrative embodiment of a general computer system 200 is shown. The computer system 200 can include a set of instructions that can be executed to cause the computer system 200 to perform any one or more of the methods or computer based functions disclosed herein. The computer system 200 may operate as a standalone device or may be connected, e.g., using a network, to other computer systems or peripheral devices. Any of the components discussed above, such as the processor 202, may be a computer system 200 or a component in the computer system 200. The computer system 200 may be specifically configured to implement a match engine, margin processing, payment or clearing function on behalf of an exchange, such as the Chicago Mercantile Exchange, of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control or any other device operative to interact with the system 200.

In a particular embodiment, as depicted in FIG. 2, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed above.

The present disclosure contemplates a computer-readable medium that includes instructions 212 or receives and executes instructions 212 responsive to a propagated signal, so that a device connected to a network 220 can communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly as discussed herein. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the disclosed embodiments may be applicable to other types of messages depending upon the implementation. Further, the messages may comprise one or more data packets, datagrams or other collection of data formatted, arranged configured and/or packaged in a particular one or more protocols, e.g., the FIX protocol, TCP/IP, Ethernet, etc., suitable for transmission via a network 214 as was described, such as the message format and/or protocols described in U.S. Pat. No. 7,831,491 and U.S. Patent Publication No. 2005/0096999 A1, both of which are incorporated by reference herein in their entireties and relied upon. Further, the disclosed message management system may be implemented using an open message standard implementation, such as FIX, FIX Binary, FIX/FAST, or by an exchange-provided API.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method for processing electronic data transaction request messages for a data object in a data transaction processing system, the method comprising:
   receiving, by a processor from a first source, a first electronic data transaction request message to perform a first transaction of a first transaction type on a data object;
   processing, by the processor, the first electronic data transaction request message, wherein processing an electronic data transaction request comprises determining whether the electronic data transaction request message matches with another electronic data transaction request message;
   receiving, by the processor from a second source, a second electronic data transaction request message to perform a second transaction of the first transaction type on the data object;
   processing, by the processor, the second electronic data transaction request message;
   receiving, by the processor from the first source, a third electronic data transaction request message to undo results of processing the first electronic data transaction request message;
   processing, by the processor, the third electronic data transaction request message;
   receiving, by the processor from the first source, within a first predetermined amount of time after receiving the third electronic data transaction request message, a fourth electronic data transaction request message to perform a first transaction of a second transaction type on the data object;
   upon determining that processing the fourth electronic data transaction request message would result in a match between the second and the fourth electronic data transaction request messages, automatically preventing, by the processor, further processing of the fourth electronic data transaction request message; and
   after a passage of a second predetermined amount of time, enabling further processing, by the processor, of the fourth electronic data transaction request message.

2. The computer implemented method of claim 1, wherein the data transaction processing system does not transmit data identifying any one source to any other source.

3. The computer implemented method of claim 2, wherein the data transaction processing system does not transmit, to the second source, data indicating that the first, third and fourth electronic data transaction request messages were received from the first source.

4. The computer implemented method of claim 1, further comprising:
   receiving, by the processor from a third source, after receiving the fourth electronic data transaction request message, a fifth electronic data transaction request message to perform a second transaction of the second transaction type on the data object; and processing, by the processor, the fifth electronic data transaction request message, wherein processing the fifth electronic data transaction request message results in a match between the second and fifth electronic data transaction request messages.

5. The computer implemented method of claim 4, wherein the processor processes the fifth electronic data transaction request message without processing the fourth electronic data transaction request message even if the fourth electronic data transaction request message has a higher priority than the fifth electronic data transaction request message.

6. The computer implemented method of claim 4, wherein processing the fifth electronic data transaction request message results in at least partial satisfaction of one or both of the second or fifth electronic data transaction request messages.

7. The computer implemented method of claim 1, further comprising:
receiving, by the processor from the second source, a sixth electronic data transaction request message to undo results of processing the second electronic data transaction request message; and
processing, by the processor, the sixth electronic data transaction request message.

8. The computer implemented method of claim 1, further comprising determining that electronic data transaction request messages are transmitted by a same source if the electronic data transaction request messages: originate from a same client computer; originate from a same client server; are associated with a same client identifier; or are associated with a same user identifier.

9. The computer implemented method of claim 1, wherein the second transaction type is counter to the first transaction type.

10. The computer implemented method of claim 9, wherein the data transaction processing system is an exchange computing system, wherein the first transaction type is one of relinquish or purchase a quantity of a financial instrument traded in the exchange computing system and associated with the data object, and wherein the second transaction type is the other of relinquish or purchase a quantity of the financial instrument traded in the exchange computing system and associated with the data object.

11. The computer implemented method of claim 1, wherein values associated with electronic data transaction request messages are stored in a data structure, wherein the data structure comprises a first and second queue associated with the data object, wherein the first queue stores data related to transactions of the first transaction type, and wherein the second queue stores data related to transactions of the second transaction type.

12. The computer implemented method of claim 1, wherein the processor is a matching processor, and wherein preventing further processing of an electronic data transaction request message received for the data object includes preventing matching of the electronic data transaction request message by the matching processor.

13. The computer implemented method of claim 1, wherein the processing of an electronic data transaction request message results in modification of the data object based on the electronic data transaction request message, and the preventing of further processing of an electronic data transaction request message prevents modification of the data object based on the electronic data transaction request message.

14. The computer implemented method of claim 13, further comprising:

upon modifying a data object based on an electronic data transaction request message received from a transmitting source, publishing, by the processor, to a plurality of sources, data indicating the modification to the data object based on the electronic data transaction request message, the published data not including identifying information about the transmitting source.

15. The computer implemented method of claim 1, further comprising, determining, by the processor, that a predetermined amount of a quantity associated with the first transaction type for the data object is associated with the first source before automatically preventing further processing of the fourth electronic data transaction request message.

16. The computer implemented method of claim 1, wherein the preventing of processing, by the processor, of the fourth electronic data transaction request message further comprises preventing, temporarily, by the processor, further processing of the fourth electronic data transaction request message.

17. A non-transitory computer-readable medium storing instructions that, when executed by a processor, cause the processor to:
receive, from a first source, a first electronic data transaction request message to perform a first transaction of a first transaction type on a data object;
process the first electronic data transaction request message, wherein the process comprises a determination as to whether an electronic data transaction request message matches with another electronic data transaction request message;
receive, by the processor from a second source, a second electronic data transaction request message to perform a second transaction of the first transaction type on the data object;
process the second electronic data transaction request message;
receive, by the processor from the first source, a third electronic data transaction request message to undo results of processing the first electronic data transaction request message;
process the third electronic data transaction request message;
receive, by the processor from the first source, within a first predetermined amount of time after receiving the third electronic data transaction request message, a fourth electronic data transaction request message to perform a first transaction of a second transaction type on the data object;
upon determining that processing the fourth electronic data transaction request message would result in a match between at least one parameter of the second and fourth electronic data transaction request messages, automatically prevent further processing of the fourth electronic data transaction request message; and
after a passage of a second predetermined amount of time, enable further processing of the fourth electronic data transaction request message.

18. The non-transitory computer-readable medium of claim 17, wherein when executed by the processor, the stored instructions further cause the processor to prevent, temporarily, further processing of the fourth electronic data transaction request message.

19. A computer implemented method for suspending execution of a message, the method comprising:
receiving, by a processor, a plurality of messages over a network, the messages defining a received message pattern;

comparing, by the processor, the received message pattern to a predetermined message pattern stored in a memory coupled with the processor; and upon determining that the received message pattern corresponds to the predetermined message pattern, automatically suspending, by the processor, processing of one of the messages of the plurality of messages defining the received message pattern wherein the stored predetermined message pattern comprises:

two electronic data transaction request messages received from a first source, wherein one of the two electronic data transaction request messages requests cancellation of the other of the two electronic data transaction request messages;

an electronic data transaction request message received from a second source between the two electronic data transaction request messages received from the first source; and another electronic data transaction request message received from the first source after receiving the electronic data transaction request message received from the second source that, if processed, would match the electronic data transaction request message received from the second source; and wherein the suspended message is the another electronic data transaction request message received from the first source after receiving the electronic data transaction request message received from the second source.

20. A computer system for processing electronic data transaction request messages, the method comprising:

means for receiving, from a first source, a first electronic data transaction request message to perform a first transaction of a first transaction type on a data object;

means for processing the first electronic data transaction request message, wherein processing an electronic data transaction request comprises determining whether the electronic data transaction request message matches with another electronic data transaction request message;

means for receiving, by the processor from a second source, a second electronic data transaction request message to perform a second transaction of the first transaction type on the data object;

means for processing the second electronic data transaction request message;

means for receiving, by the processor from the first source, a third electronic data transaction request message to undo results of processing the first electronic data transaction request message;

means for processing the third electronic data transaction request message;

means for receiving, by the processor from the first source, within a first predetermined amount of time after receiving the third electronic data transaction request message, a fourth electronic data transaction request message to perform a first transaction of a second transaction type on the data object;

means for, upon determining that processing the fourth electronic data transaction request message would result in a match between the second and fourth electronic data transaction request messages, automatically preventing further processing of the fourth electronic data transaction request message; and means for, after a passage of a second predetermined amount of time, enabling further processing, of the fourth electronic data transaction request message.

* * * * *